United States Patent
Rivers et al.

(10) Patent No.: US 11,430,332 B2
(45) Date of Patent: Aug. 30, 2022

(54) UNMANNED AERIAL SYSTEM ASSISTED NAVIGATIONAL SYSTEMS AND METHODS

(71) Applicant: FLIR Belgium BVBA, Meer (BE)

(72) Inventors: Mark Rivers, Winchester (GB); Christopher D. Gatland, Fareham (GB); Cenk Tugcetin, Thatcham (GB); Chris Jones, Fareham (GB); Adam Murphy, Manchester, NH (US)

(73) Assignee: FLIR Belgium BVBA, Meer (BE)

( * ) Notice: Subject to any disclaimer, the term of this patent is extended or adjusted under 35 U.S.C. 154(b) by 545 days.

(21) Appl. No.: 16/273,011

(22) Filed: Feb. 11, 2019

(65) Prior Publication Data

US 2019/0172348 A1    Jun. 6, 2019

Related U.S. Application Data

(63) Continuation-in-part of application No. PCT/US2017/049970, filed on Sep. 1, 2017.
(Continued)

(51) Int. Cl.
*B64C 39/02* (2006.01)
*B64F 1/00* (2006.01)
(Continued)

(52) U.S. Cl.
CPC ......... *G08G 1/0968* (2013.01); *B64C 39/024* (2013.01); *G05D 1/101* (2013.01);
(Continued)

(58) Field of Classification Search
None
See application file for complete search history.

(56) References Cited

U.S. PATENT DOCUMENTS

| 3,964,694 A | 6/1976 | Metzger et al. |
| 8,718,838 B2 | 5/2014 | Kokkeby et al. |

(Continued)

FOREIGN PATENT DOCUMENTS

| CN | 104132830 | 11/2014 |
| CN | 105059558 | 11/2015 |

(Continued)

OTHER PUBLICATIONS

Air-Sea Interaction Laboratory, retrieved at http://airsea.ucsd.edu/index.php?option=com_content&task=view&id=54&Itemid=70, 2 pages.

(Continued)

*Primary Examiner* — Adam D Tissot
*Assistant Examiner* — Laura E Linhardt
(74) *Attorney, Agent, or Firm* — Haynes and Boone, LLP

(57) ABSTRACT

Flight based infrared imaging systems and related techniques, and in particular unmanned aerial system (UAS) based systems, are provided for aiding in operation and/or piloting of a mobile structure. Such systems and techniques may include determining environmental conditions around the mobile structure with the UAS detecting the presence of objects and/or persons around the mobile structure and/or determining the presence of other structures around the mobile structure. Instructions for the operation of such mobile structures may then be accordingly determined responsive to such data.

20 Claims, 16 Drawing Sheets

Related U.S. Application Data

(60) Provisional application No. 62/629,666, filed on Feb. 12, 2018, provisional application No. 62/383,342, filed on Sep. 2, 2016.

(51) Int. Cl.

| | | |
|---|---|---|
| *B64D 47/08* | (2006.01) | |
| *G01S 19/42* | (2010.01) | |
| *G05D 1/00* | (2006.01) | |
| *G08G 1/0968* | (2006.01) | |
| *G08G 5/00* | (2006.01) | |
| *G08G 5/02* | (2006.01) | |
| *G08G 3/00* | (2006.01) | |
| *G08G 7/00* | (2006.01) | |
| *G05D 1/10* | (2006.01) | |
| *G06F 3/00* | (2006.01) | |

(52) U.S. Cl.
CPC ............ *G06F 3/00* (2013.01); *G08G 3/00* (2013.01); *G08G 5/006* (2013.01); *G08G 5/0013* (2013.01); *G08G 5/0052* (2013.01); *G08G 5/0056* (2013.01); *G08G 5/0069* (2013.01); *G08G 5/0078* (2013.01); *G08G 5/0086* (2013.01); *G08G 5/025* (2013.01); *G08G 7/00* (2013.01); *B64C 2201/123* (2013.01); *B64C 2201/141* (2013.01); *B64C 2201/208* (2013.01)

(56) References Cited

U.S. PATENT DOCUMENTS

| | | | |
|---|---|---|---|
| 8,797,550 | B2 | 8/2014 | Hays et al. |
| 9,056,676 | B1 | 6/2015 | Wang |
| 9,151,858 | B2 | 10/2015 | Hovstein |
| 10,633,115 | B2 * | 4/2020 | Pilskalns .............. B60L 53/126 |
| 2005/0124234 | A1 | 6/2005 | Sells et al. |
| 2011/0073707 | A1 | 3/2011 | Bossert et al. |
| 2013/0200207 | A1 * | 8/2013 | Pongratz ................. B64C 37/02 244/2 |
| 2015/0284010 | A1 | 10/2015 | Beardsley et al. |
| 2015/0370251 | A1 | 12/2015 | Siegel et al. |
| 2016/0016663 | A1 | 1/2016 | Stanek et al. |
| 2016/0070265 | A1 * | 3/2016 | Liu ....................... G05D 1/0088 701/3 |
| 2016/0214715 | A1 * | 7/2016 | Meffert ................. B64C 39/024 |
| 2016/0340006 | A1 | 11/2016 | Tang |
| 2019/0220002 | A1 * | 7/2019 | Huang ...................... G06T 7/70 |

FOREIGN PATENT DOCUMENTS

| | | | |
|---|---|---|---|
| CN | 105510082 | 4/2016 | |
| DE | 102014226458 | 6/2016 | |
| FR | 2986647 | 8/2013 | |
| GB | 2568851 | 5/2019 | |
| JP | 2017104025 | 6/2017 | |
| WO | WO-2005123502 A2 * | 12/2005 | ........... G05D 1/0094 |
| WO | WO 2008/029384 | 3/2008 | |
| WO | WO 2016/203322 | 12/2016 | |
| WO | WO 2018/045354 | 3/2018 | |

OTHER PUBLICATIONS

Benjamin D. Reineman, "The Development of Instrumentation and Methods for Measurement of Air-Sea Interaction and Coastal Processes from Manned and Unmanned Aircraft", 2013, pp. 1-183, UC San Diego Electronic Theses and Dissertations, Doctor of Philosophy in Engineering Sciences (Applied Ocean Sciences), University of California, San Diego.

Cascella et al., "Inner-core characteristics of Ophelia (2005) and Noel (2007) as revealed by Aerosonde data", Apr. 2008, Session 7C.4, p. 1, 28th Conference on Hurricanes and Tropical Meteorology, Orlando, FL. 2008.

Cassano et al., "UAV observations of the wintertime boundary layer over the Terra Bay Polynya, Antarctica", Geophysical Research Abstracts, May 2010, vol. 12, p. 1, EGU2010-3619, 2010 EGU General Assembly 2010.

Christopher R. Machado, "An analysis of meteorological measurements using a miniature quad-rotor unmanned aerial system", Jun. 2015, pp. 1-98, Thesis, Diss. Monterey, California: Naval Postgraduate School, Calhoun: The NPS Institutional Archive.

Dias et al., "Obtaining Potential Virtual Temperature Profiles, Entrainment Fluxes, and Spectra from Mini Unmanned Aerial Vehicle Data", Boundary-layer meteorology, Oct. 2012, vol. 145, Issue 1, pp. 93-111, https://doi.org/10.1007/s10546-011-9693-2, Springer Science+Business Media B.V. 2012, Springer Netherlands.

Holder et al., "Processing Turbulence Data Collected on board the Helicopter Observation Platform (HOP) with the Empirical Mode Decomposition (EMD) Method", May 2011, vol. 28.5 pp. 671-683, Journal of Atmospheric and Oceanic Technology, DOI: 10.1175/2011JTECHA1410.1, American Meteorological Society.

Joel N. Shurkin, "Surfboard-Sized Drones Crossing Pacific to Monitor Sea Surface", Wave Gliders study the ocean surface en route to Asia, Australia, and the Guinness Book of World Records, ISNS Contributor; Originally published: Jan. 17, 2012, https://www.insidescience.org/content/surfboard-sized-drones-crossing-pacific-monitor-seasurface/592, 4 pages.

Mayer et al., "Profiling the Arctic stable boundary layer in Advent valley, Svalbard: measurements and simulations." Boundary-layer meteorology, Jun. 2012, vol. 143, Issue 3, pp. 507-526, DOI https://doi.org/10.1007/s10546-012-9709-6, Springer Netherlands.

Reineman et al., "Development and Testing of Instrumentation for UAV-Based Flux Measurements within Terrestrial and Marine Atmospheric Boundary Layers", Jul. 2013, vol. 30, pp. 1295-1319, Journal of Atmospheric and Oceanic Technology, DOI: 10.1175/JTECH-D-12-00176.1, American Meteorological Society.

Thomas et al., "Measurement of turbulent water vapor fluxes using a lightweight unmanned aerial vehicle system", Atmospheric Measurement Techniques Discussions, Jan. 27, 2012, No. 5, pp. 243-257, https://doi.org/10.5194/amt-5-243-2012, doi:10.5194/amtd-4-5529-2011, Published by Copernicus Publications on behalf of the European Geosciences Union.

\* cited by examiner

Accessing information and options for one of the drones, via electronic chart application Electronic chart showing overview of multiple drones running search patterns, controlled from boat MFD

UNMANNED AERIAL SYSTEM ASSISTED NAVIGATIONAL SYSTEMS AND METHODS

CROSS-REFERENCE TO RELATED APPLICATIONS

This application also claims priority to and the benefit of U.S. Provisional Patent Application No. 62/629,666 filed Feb. 12, 2018 and entitled "UNMANNED AERIAL SYSTEM ASSISTED NAVIGATIONAL SYSTEMS AND METHODS," which is hereby incorporated by reference its entirety.

This application is a continuation-in-part of International Patent Application PCT/US2017/049970 filed Sep. 1, 2017 and entitled "UNMANNED AERIAL SYSTEM ASSISTED NAVIGATIONAL SYSTEMS AND METHODS," which claims priority to and the benefit of U.S. Provisional Patent Application No. 62/383,342 filed Sep. 2, 2016 and entitled "UNMANNED AERIAL SYSTEM ASSISTED NAVIGATIONAL SYSTEMS AND METHODS," which are hereby incorporated by reference in their entirety.

TECHNICAL FIELD

The present invention relates generally to unmanned aerial systems and, more particularly, to unmanned aerial systems for aiding movement of mobile structures.

BACKGROUND

As the size and weight of infrared cameras has decreased over time, their use has expanded from primarily ground based monitoring to hand held monitoring and, in recent systems, monitoring from the air through use of unmanned aerial systems (UASs). Mobile structures, including vehicles such as watercraft, automobiles, trains, and cars, may benefit from the coordinated use of UASs.

SUMMARY

Flight based infrared imaging systems and related techniques, and in particular UAS based systems, are provided to improve operation and/or piloting of a mobile structure. In certain embodiments, an apparatus may be provided. The apparatus may include a logic device associated with a mobile structure and configured to communicate with an imaging device. The logic device may be configured to receive unmanned aerial systems (UAS) data from one or more UASs associated with the mobile structure, where at least a portion of the UAS data comprises data associated with a thermal camera coupled to the one or more UASs, determine an environmental condition from the UAS data, and output/provide an environmental condition determination (e.g., for display to a user, input to an autopilot, and/or further processing to facilitate operation of the mobile structure and/or the UAS).

In certain other embodiments, a method may be provided. The method may include receiving unmanned aerial systems (UAS) data from one or more UASs associated with a mobile structure, where at least a portion of the UAS data comprises data associated with a thermal camera coupled to the one or more UASs, determining an environmental condition from the UAS data, and outputting/providing an environmental condition determination (e.g., for display to a user, input to an autopilot, and/or further processing to facilitate operation of the mobile structure and/or the UAS).

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Embodiments of the present invention and their advantages are best understood by referring to the detailed description that follows. It should be appreciated that like

DETAILED DESCRIPTION

Flight based imaging systems and related techniques, and in particular unmanned aerial system (UAS) based imaging systems, are provided to improve control and piloting of mobile structures associated with the UAS. In some embodiments, the UAS may include one or more sensors that may be configured to acquire data associated with the mobile structure and/or an environment around the mobile structure. Such data may be used to aid in the piloting of the mobile structure and/or in performing a task with the mobile structure. Furthermore, interoperability between the mobile structure and any UASs and/or UAS based imaging systems may be facilitated using various techniques described herein.

Reference may be made to thermal, infrared, radiant, radiance, irradiance, and/or other images and bands. For the purposes of this disclosure, such reference may be used generally to refer to temperature based (e.g., infrared wavelength) or thermal imaging.

Figure 1A:
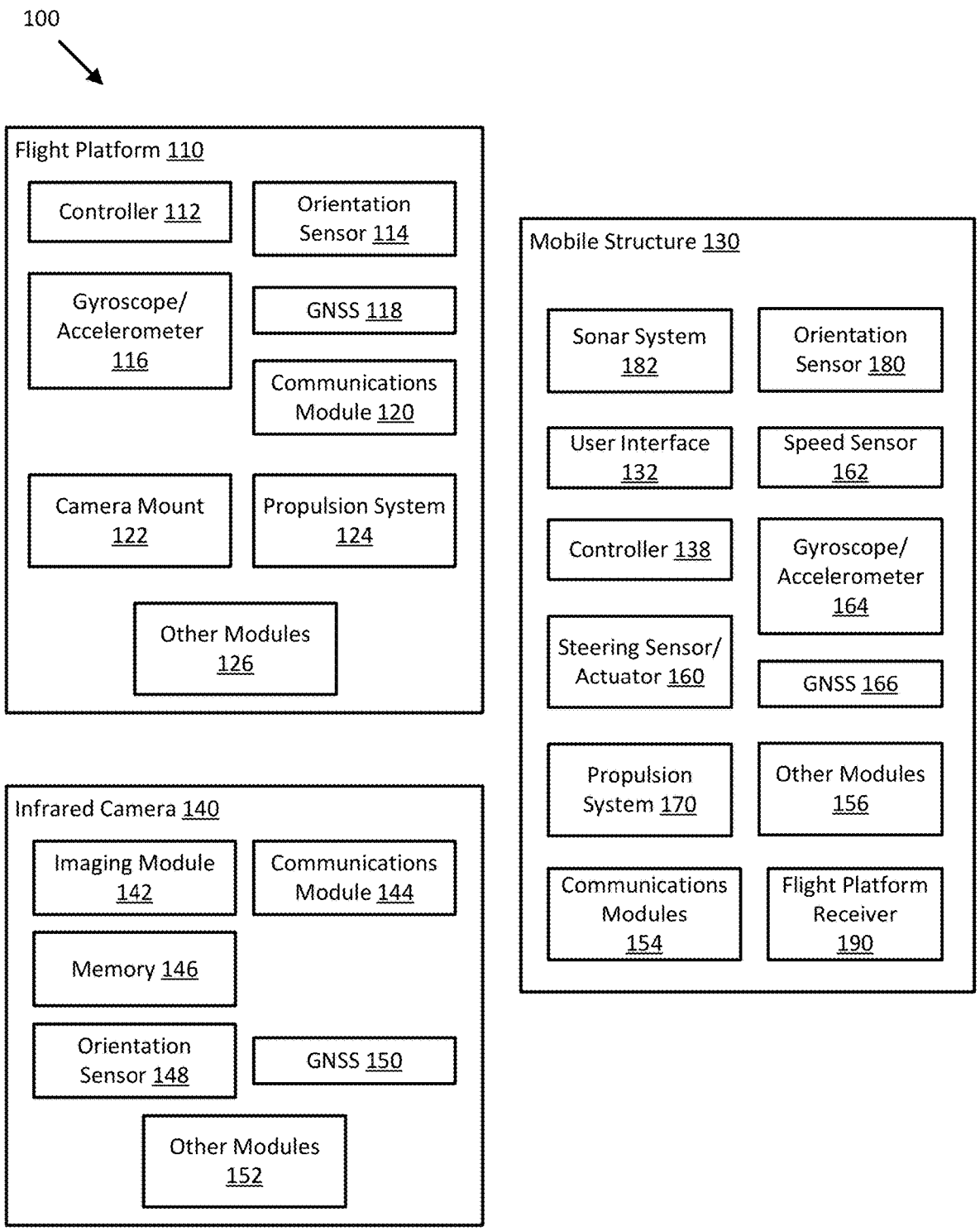
FIG. 1A illustrates a block diagram of a system in accordance with an embodiment of the disclosure.

FIG. 1A illustrates a block diagram of infrared imaging system 100 in accordance with an embodiment of the disclosure. In some embodiments, system 100 may include a flight platform 110, an infrared camera 140, and a mobile structure 130. Data generated by the infrared camera 140 and/or sensors coupled to the flight platform 110 and/or mobile structure 130 may be processed (e.g., by infrared camera 140, flight platform 110, and/or mobile structure 130) and displayed to a user through use of user interface 132 (e.g., one or more displays such as a multi-function display (MFD), a portable electronic device such as a tablet, laptop, or smart phone, or other appropriate interface) and/or stored in memory for later viewing and/or analysis. In some embodiments, system 100 may be configured to use such imagery to control operation of flight platform 110, infrared camera 140, and/or mobile structure 130 as described herein, such as controlling camera mount 122 to aim infrared camera 122 towards a particular direction, controlling propulsion system 124 to move flight platform 110 to a desired position relative to a target, and/or providing navigation data for moving mobile structure 130.

In the embodiment shown in FIG. 1A, infrared imaging system 100 may include flight platform 110, mobile structure 130, and infrared camera 140. Flight platform 110 may be configured to fly and position and/or aim infrared camera 140 (e.g., relative to a designated or detected target) and may include one or more of a controller 112, an orientation sensor 114, a gyroscope/accelerometer 116, a global navigation satellite system (GNSS) 118, a communications module 120, a camera mount 122, a propulsion system 124, and other modules 126. Operation of flight platform 110 may be substantially autonomous and/or partially or completely controlled by an external source from, for example, mobile structure 130 (e.g., an operator and/or remote controller located on mobile structure 130), which may include one or more of a user interface 132, communications module 134, and other modules 136. Infrared camera 140 may be physically coupled to flight platform 110 and be configured to capture infrared images of a target position, area, and/or object(s) as selected and/or framed by operation of flight platform 110 and/or base station 130. In some embodiments, data from controller 112, orientation sensor 114 and/or 148, GNSS 118 and/or 150, communications module 120, 134 and/or 144, other modules 126, 136, and/or 152, imaging module 142, and/or other components may be communicated to a secondary device (e.g., a smartphone, tablet, computer, and/or other such device). Additionally, the secondary device may also communicate data to flight platform 110, mobile structure 130, and/or infrared camera 140.

Controllers 112 and/or 138 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of flight platform 110 and/or other elements of system 100, for example. Such software instructions may also implement methods for processing infrared images and/or other sensor signals, determining sensor information, providing user feedback (e.g., through user interface 132), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 112 and/or 138. In these and other embodiments, controller 112 and/or 138 may be implemented with other components where appropriate, such as volatile memory, non-volatile memory, one or more interfaces, and/or various analog and/or digital components for interfacing with devices of system 100. For example, controller 112 and/or 138 may be adapted to store sensor signals, sensor information, parameters for coordinate frame transformations, calibration parameters, sets of calibration points, and/or other operational parameters, over time, for example, and provide such stored data to a user using user interface 132. In some embodiments, controller 112 may be integrated with one or more other elements of flight platform 110, for example, or distributed as multiple logic devices within flight platform 110. In some embodiments, controller 138 may be integrated with one or more elements of mobile structure 130 or distributed as multiple logic devices within mobile structure 130.

Orientation sensor 114 may be implemented as one or more of a compass, float, accelerometer, and/or other device capable of measuring an orientation of flight platform 110 (e.g., magnitude and direction of roll, pitch, and/or yaw, relative to one or more reference orientations such as gravity and/or Magnetic North) and providing such measurements as sensor signals that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of flight platform 110 and providing such measurements as sensor signals that may be communicated to other devices of system 100 (e.g., user interface 132, controller 112 and/or 138).

GNSS 118 may be implemented according to any global navigation satellite system, including a GPS, GLONASS, and/or Galileo based receiver and/or other device capable of determining absolute and/or relative position of flight platform 110 (e.g., or an element of flight platform 110) based on wireless signals received from space-born and/or terrestrial sources (e.g., eLoran, and/or other at least partially terrestrial systems), for example, and capable of providing such measurements as sensor signals that may be communicated to various devices of system 100. In some embodiments, GNSS 118 may include an altimeter, for example, or may be used to provide an absolute altitude.

Communications module 120 may be implemented as any wired and/or wireless communications module configured to transmit and receive analog and/or digital signals between elements of system 100. For example, communications module 120 may be configured to receive flight control signals from mobile structure 130 and provide them to controller 112 and/or propulsion system 124. In other embodiments, communications module 120 may be configured to receive infrared images (e.g., still images or video images) from infrared camera 140 and relay the infrared images to controller 112 and/or mobile structure 130. In some embodiments, communications module 120 may be configured to support spread spectrum transmissions, for example, and/or multiple simultaneous communications channels between elements of system 100.

In some embodiments, camera mount 122 may be implemented as an actuated gimbal mount, for example, that may be controlled by controller 112 to stabilize infrared camera 140 relative to a target or to aim infrared camera 140 according to a desired direction and/or relative position. As such, camera mount 122 may be configured to provide a relative orientation of infrared camera 140 (e.g., relative to an orientation of flight platform 110) to controller 112 and/or communications module 120. In other embodiments, camera mount 122 may be implemented as a fixed mount. In various embodiments, camera mount 122 may be configured to provide power, support wired communications, provide a shutter, and/or otherwise facilitate flight operation of infrared camera 140. In further embodiments, camera mount 122 may be configured to couple to a laser pointer, range finder, and/or other device, for example, to support, stabilize, power, and/or aim multiple devices (e.g., infrared camera 140 and one or more other devices) substantially simultaneously.

Propulsion system 124 may be implemented as one or more propellers, turbines, or other thrust-based propulsion systems, and/or other types of propulsion systems that can be used to provide motive force and/or lift to flight platform 110 and/or to steer flight platform 110. In some embodiments, propulsion system 124 may include multiple propellers (e.g., a tri, quad, hex, oct, or other type "copter") that can be controlled (e.g., by controller 112) to provide lift and motion for flight platform 110 and to provide an orientation for flight platform 110. In other embodiments, propulsion system 110 may be configured primarily to provide thrust while other structures of flight platform 110 provide lift, such as in a fixed wing embodiment (e.g., where wings provide the lift) and/or an aerostat embodiment (e.g., balloons, airships, hybrid aerostats). In various embodiments, propulsion system 124 may be implemented with a portable power supply, such as a battery and/or a combustion engine/generator and fuel supply.

Other modules 126 may include other and/or additional sensors, actuators, communications modules/nodes, and/or user interface devices used to provide additional environmental information of flight platform 110, for example. In some embodiments, other modules 126 may include a humidity sensor, a wind and/or water temperature sensor, a barometer, an altimeter, a radar system, a visible spectrum camera, an additional infrared camera (with an additional mount), an irradiance detector, an ozone sensor, a carbon monoxide and/or dioxide sensor, a nephelometer, a HDR imaging device, and/or other environmental sensors providing measurements and/or other sensor signals that can be displayed to a user and/or used by other devices of system 100 (e.g., controller 112) to provide operational control of flight platform 110 and/or system 100 or to process infrared imagery to compensate for environmental conditions, such as water content in the atmosphere between infrared camera 140 and a target, for example. In some embodiments, other modules 126 may include one or more actuated and/or articulated devices (e.g., multi-spectrum active illuminators, visible and/or IR cameras, radars, sonars, and/or other actuated devices) coupled to flight platform 110, where each actuated device includes one or more actuators adapted to adjust an orientation of the device, relative to flight platform 110, in response to one or more control signals (e.g., provided by controller 112).

User interface 132 of mobile structure 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communications module 134 of mobile structure 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of flight platform 110 and/or other elements of system 100. For example, user interface 132 may be adapted to display a time series of positions, headings, and/or orientations of flight platform 110 and/or other elements of system 100 overlaid on a geographical map, which may include one or more graphs indicating a corresponding time series of actuator control signals, sensor information, and/or other sensor and/or control signals.

In some embodiments, user interface 132 may be adapted to accept user input including a user-defined target heading, waypoint, route, and/or orientation for an element of system 100, for example, and to generate control signals to cause flight platform 110 to move according to the target heading, route, and/or orientation. In other embodiments, user interface 132 may be adapted to accept user input modifying a control loop parameter of controller 112 and/or 138, for example.

In further embodiments, user interface 132 may be adapted to accept user input including a user-defined target attitude, orientation, and/or position for an actuated device (e.g., infrared camera 140) associated with flight platform 110, for example, and to generate control signals for adjusting an orientation and/or position of the actuated device according to the target attitude, orientation, and/or position. Such control signals may be transmitted to controller 112 (e.g., using communications modules 154 and 120), which may then control flight platform 110 accordingly.

Communications module 154 may be implemented as any wired and/or wireless communications module configured to transmit and receive analog and/or digital signals between elements of system 100. For example, communications module 154 may be configured to transmit flight control signals from user interface 132 to communications module 120 or 144. In other embodiments, communications module 154 may be configured to receive infrared images (e.g., still images or video images) from infrared camera 140. In some embodiments, communications module 154 may be configured to support spread spectrum transmissions, for example, and/or multiple simultaneous communications channels between elements of system 100.

In certain embodiments, mobile structure 130 may include navigational sensors such as a sonar system 182, a steering sensor/actuator 160, an orientation sensor 180, a speed sensor 162, a gyroscope/accelerometer 164, a global navigation satellite system (GNSS) 166, and/or other modules 156 (i.e., a radar system, other ranging sensors, various environmental sensors, sensors directed towards the dynamic characteristics of the mobile structure, and/or other sensors). Other modules 156 may include other and/or additional sensors, actuators, communications modules/nodes, and/or user interface devices used to provide additional environmental information of mobile structure 130, for example. In some embodiments, other modules 156 may include a humidity sensor, a wind and/or water temperature sensor, a barometer, a radar system, a visible spectrum camera, an infrared camera, lidar systems, a salinity sensor such as a sea surface salinity sensor, and/or other environmental sensors providing measurements and/or other sensor signals that can be displayed to a user and/or used by other devices of system 100 (e.g., controller 112 and/or 138) to provide operational control of mobile structure 130 and/or system 100 that compensates for environmental conditions, such as wind speed and/or direction, swell speed, amplitude, and/or direction, and/or an object in a path of mobile structure 130, for example. In some embodiments, other modules 156 may include one or more actuated devices (e.g., spotlights, infrared and/or visible light illuminators, infrared and/or visible light cameras, radars, sonars, lidar systems, and/or other actuated devices) coupled to mobile structure 130, where each actuated device includes one or more actuators adapted to adjust an orientation of the device, relative to mobile structure 130, in response to one or more control signals (e.g., provided by controller 112 and/or 138). Additionally, other modules 156 may also include orientation and/or position sensors associated with sensors of the other modules 156. The orientation and/or position sensors may be incorporated within the sensors of the other modules 156, or may be separate from the sensors of the other modules 156.

Imaging module 142 of infrared camera 140 may be implemented as a cooled and/or uncooled array of detector elements, such as quantum well infrared photodetector elements, bolometer or microbolometer based detector elements, type II superlattice based detector elements, and/or other infrared spectrum detector elements that can be arranged in a focal plane array. In various embodiments, imaging module 142 may include one or more logic devices (e.g., similar to controller 112 and/or 138) that can be configured to process imagery captured by detector elements of imaging module 142 before providing the imagery to memory 146 or communications module 144. More generally, imaging module 142 may be configured to perform any of the operations or methods described herein, at least in part, or in combination with controller 112 and/or 138 and/or user interface 132.

In some embodiments, infrared camera 140 may be implemented with a second or additional imaging modules similar to imaging module 142, for example, that may be include detector elements configured to detect other spectrums, such as visible light, ultraviolet, and/or other spectrums or subsets of spectrums. In various embodiments, such additional imaging modules may be calibrated or registered to imaging module 142 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

Communications module 144 of infrared camera 140 may be implemented as any wired and/or wireless communications module configured to transmit and receive analog and/or digital signals between elements of system 100. For example, communications module 144 may be configured to transmit infrared images from imaging module 142 to communications module 120 or 154. In other embodiments, communications module 144 may be configured to receive control signals (e.g., control signals directing capture, focus, selective filtering, and/or other operation of infrared camera 140) from controller 112 and/or 138 and/or user interface 132. In some embodiments, communications module 144 may be configured to support spread spectrum transmissions, for example, and/or multiple simultaneous communications channels between elements of system 100.

Memory 146 may be implemented as one or more machine readable mediums and/or logic devices configured to store software instructions, sensor signals, control signals, operational parameters, calibration parameters, infrared images, and/or other data facilitating operation of system 100, for example, and provide it to various elements of system 100. Memory 146 may also be implemented, at least in part, as removable memory, such as a secure digital memory card for example including an interface for such memory.

Orientation sensor 148 of infrared camera 140 may be implemented similar to orientation sensor 114 or gyroscope/accelerometer 116, and/or another device capable of measuring an orientation of infrared camera 140 and/or imaging module 142 (e.g., magnitude and direction of roll, pitch, and/or yaw, relative to one or more reference orientations such as gravity and/or Magnetic North) and providing such measurements as sensor signals that may be communicated to various devices of system 100. GNSS 150 of infrared camera 140 may be implemented according to any global navigation satellite system, including a GPS, GLONASS, and/or Galileo based receiver and/or other device capable of determining absolute and/or relative position of infrared camera 140 (e.g., or an element of infrared camera 140) based on wireless signals received from space-born and/or terrestrial sources, for example, and capable of providing such measurements as sensor signals that may be communicated to various devices of system 100.

Other modules 152 of infrared camera 140 may include other and/or additional sensors, actuators, communications modules/nodes, cooled or uncooled optical filters, and/or user interface devices used to provide additional environmental information associated with infrared camera 140, for example. In some embodiments, other modules 152 may include a humidity sensor, a wind and/or water temperature sensor, a barometer, a radar system, a visible spectrum camera, an infrared camera, a GNSS, a nephelometer, an ozone sensor, a carbon monoxide and/or dioxide sensor, a HDR imaging device, and/or other environmental sensors providing measurements and/or other sensor signals that can be displayed to a user and/or used by imaging module 142 or other devices of system 100 (e.g., controller 112 and/or 138) to provide operational control of flight platform 110 and/or system 100 or to process infrared imagery to compensate for environmental conditions, such as an water content in the atmosphere approximately at the same altitude and/or within the same area as infrared camera 140, for example.

Referring back to mobile structure 130, sonar system 182 may be configured to image a body of water and/or a seafloor located nearby the mobile structure 130. Sonar system 182 may detect objects within the body of water and/or the seafloor. Sonar system 182 may output or provide sonar data to controller 112 and/or 138.

Orientation sensor 180 may be implemented as one or more of a compass, float, accelerometer, and/or other device capable of measuring an orientation of mobile structure 130 (e.g., magnitude and direction of roll, pitch, and/or yaw, relative to one or more reference orientations such as gravity and/or Magnetic North) and providing such measurements as sensor signals that may be communicated to various devices of system 100. Gyroscope/accelerometer 164 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 130 and providing such measurements as sensor signals that may be communicated to other devices of system 100.

Steering sensor/actuator 160 may be adapted to physically adjust a heading of mobile structure 130 according to one or more control signals, user inputs, and/or stabilized attitude estimates provided by a controller of system 100, such as controller 138. Steering sensor/actuator 160 may include one or more actuators and control surfaces (e.g., a rudder or other type of steering or trim mechanism) of mobile structure 130, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 130. In some embodiments, propulsion system 170 may be non-articulated, for example, such that the direction of motive force and/or thrust generated by propulsion system 170 is fixed relative to a coordinate frame of mobile structure 130. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 160, for example, such that the direction of generated motive force and/or thrust is variable relative to a coordinate frame of mobile structure 130. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Mobile structure 130 may additionally include flight platform receiver 190. Flight platform receiver 190 may be configured to receive (e.g., interface) with flight platform 110. In certain embodiments, flight platform receiver 190 may be a landing pad, a charger, a docking station, and/or other such area and/or structure that may allow for flight platform 110 to interface with, charge, transfer data, and/or otherwise dock with mobile structure 130.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for flight platform 110, using one or more power leads. Such power leads may also be used to support one or more communication techniques between elements of system 100.

Figure 1B:
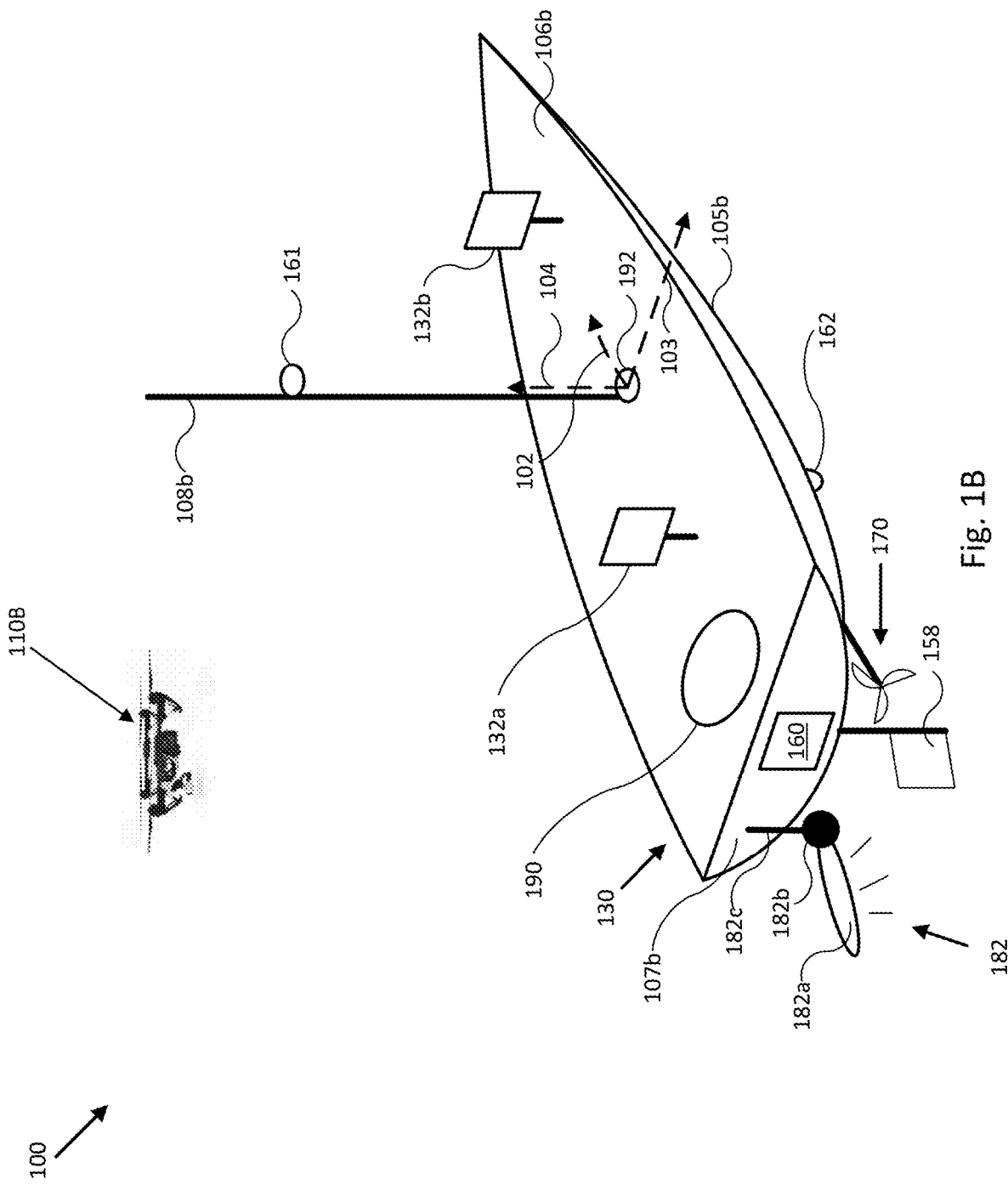
FIG. 1B illustrates a mobile structure with an unmanned aerial system in accordance with an embodiment of the disclosure.

FIG. 1B illustrates a mobile structure with an unmanned aerial system in accordance with an embodiment of the disclosure. In the embodiment shown in FIG. 1B, system 100 may be implemented to provide navigational data, such as an integrated model or some data outputs to the user, for use with operation of mobile structure 130. For example, system 100 may include sonar system 182, integrated user interface/controller 132a and/or 132b, steering sensor/actuator 160, sensor cluster 192 (e.g., orientation sensor 180, gyroscope/accelerometer 164, GNSS 166, and/or other modules 156 such as radar systems), imager cluster 161, and various other sensors and/or actuators. In the embodiment illustrated by FIG. 1B, mobile structure 130 is implemented as a motorized boat including a hull 105b, a deck 106b, a transom 107b, a mast/sensor mount 108b, a rudder 158, an inboard motor 170, and an actuated sonar system 182 coupled to transom 107b. In other embodiments, hull 105b, deck 106b, mast/sensor mount 108b, rudder 158, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 130 includes actuated sonar system 182, which in turn includes transducer assembly 182a coupled to transom 107b of mobile structure 101 through assembly bracket/actuator 182b and transom bracket/electrical conduit 182c. In some embodiments, assembly bracket/actuator 182b may be implemented as a roll, pitch, and/or yaw actuator, for example, and may be adapted to adjust an orientation of transducer assembly 182a according to control signals and/or an orientation (e.g., roll, pitch, and/or yaw) or position of mobile structure 130 provided by user interface/controller 132a and/or 132b. For example, user interface/controller 132a and/or 132b may be adapted to receive an orientation of transducer assembly 182a configured to ensonify a portion of surrounding water and/or a direction referenced to an absolute coordinate frame, and to adjust an orientation of transducer assembly 182a to retain ensonification of the position and/or direction in response to motion of mobile structure 130, using one or more orientations and/or positions of mobile structure 130 and/or other sensor information derived by executing various methods described herein.

In another embodiment, user interface/controller 132a and 132b may be configured to adjust an orientation of transducer assembly 182a to direct sonar transmissions from transducer assembly 182a substantially downwards and/or along an underwater track during motion of mobile structure 130. In such embodiment, the underwater track may be predetermined, for example, or may be determined based on criteria parameters, such as a minimum allowable depth, a maximum ensonified depth, a bathymetric route, and/or other criteria parameters. Transducer assembly 182a may be implemented with a sonar orientation and/or position sensor (OPS), which may include one or more sensors corresponding to orientation sensor 180, gyroscope/accelerometer 164, and/or GNSS 166, for example, that is configured to provide absolute and/or relative positions and/or orientations of transducer assembly 182a to facilitate actuated orientation of transducer assembly 182a.

In one embodiment, user interfaces 132a/b may be mounted to mobile structure 139 substantially on deck 106b and/or mast/sensor mount 108b. Such mounts may be fixed, for example, or may include gimbals and other leveling mechanisms/actuators so that a display of user interfaces 132a/b can stay substantially level with respect to a horizon and/or a "down" vector (e.g., to mimic typical user head motion/orientation), for example, or so the display can be oriented according to a user's desired view. In another embodiment, at least one of user interfaces 132a/b may be located in proximity to mobile structure 130 and be mobile/portable throughout a user level (e.g., deck 106b) of mobile structure 130. For example, a secondary user interface may be implemented with a lanyard, strap, headband, and/or other type of user attachment device and be physically coupled to a user of mobile structure 130 so as to be in proximity to the user and mobile structure 130. Other embodiments of the user interface may include a portable device that is not physically coupled to the user and/or mobile structure 130. In various embodiments, user interface 132a/b may be implemented with a relatively thin display that is integrated into a PCB or other electronics of the corresponding device or structure in order to reduce size, weight, housing complexity, and/or manufacturing costs.

As shown in FIG. 1B, in some embodiments, speed sensor 162 may be mounted to a portion of mobile structure 130, such as to hull 105b, and be adapted to measure a relative water speed. In some embodiments, speed sensor 162 may be adapted to provide a thin profile to reduce and/or avoid water drag. In various embodiments, speed sensor 162 may be mounted to a portion of mobile structure 130 that is substantially outside easy operational accessibility. Speed sensor 162 may include one or more batteries and/or other electrical power storage devices, for example, and may include one or more water-powered turbines to generate electrical power. In other embodiments, speed sensor 162 may be powered by a power source for mobile structure 130, for example, using one or more power leads penetrating hull 105b. In alternative embodiments, speed sensor 162 may be implemented as a wind velocity sensor, for example, and may be mounted to mast/sensor mount 108b to have relatively clear access to local wind.

In the embodiment illustrated by FIG. 1B, mobile structure 130 may include direction/longitudinal axis 102, direction/lateral axis 103, and direction/vertical axis 104 meeting approximately at mast/sensor mount 108b (e.g., near a center of gravity of mobile structure 130). In one embodiment, the various axes may define a coordinate frame of mobile structure 101 and/or sensor cluster 192.

Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100 and/or mobile structure 130. Each element of system 100 may be located at positions different from those depicted in FIG. 1B. Each device of system 100 may include one or more batteries or other electrical power storage devices, for example, and may include one or more solar cells or other electrical power generating devices. In some embodiments, one or more of the devices may be powered by a power source for mobile structure 130. As noted herein, each element of system 100 may be implemented with an antenna, a logic device, and/or other analog and/or digital components enabling that element to provide, receive, and process sensor signals and interface or communicate with one or more devices of system 100. Further, a logic device of that element may be adapted to perform any of the methods described herein.

FIG. 1B also includes a flight apparatus 110B. Flight apparatus 110B may include, for example, one or more of flight platform 110 and/or infrared camera 140 of FIG. 1A. Flight apparatus 110B may include some or all equipment that may be locally present as a part of or to operate flight platform 110 and/or infrared camera 140. Additionally, flight apparatus 110B may include equipment configured to receive instructions from mobile structure 130.

Mobile structure 130 may include a flight platform receiver 190. The flight platform receiver 190 may be a landing platform and/or area, docking station, charger, coupling, and/or other apparatus that may allow flight apparatus 110B to land, park, receive power (e.g., electrical charge and/or fuel) from, transfer data, and/or perform other such actions interfacing flight apparatus 110B with mobile structure 130. In certain embodiments, flight platform receiver 190 may include one or more features that may be configured to interface and/or engage with corresponding features on flight apparatus 110B. In certain such embodiments, such features may be required to interface and/or engage before data and/or power is transferred between the mobile structure 130 and the flight apparatus 110B. Additionally, such features may only be engaged if flight apparatus 110B is in a specific orientation relative to flight platform receiver 190.

Figure 2A:
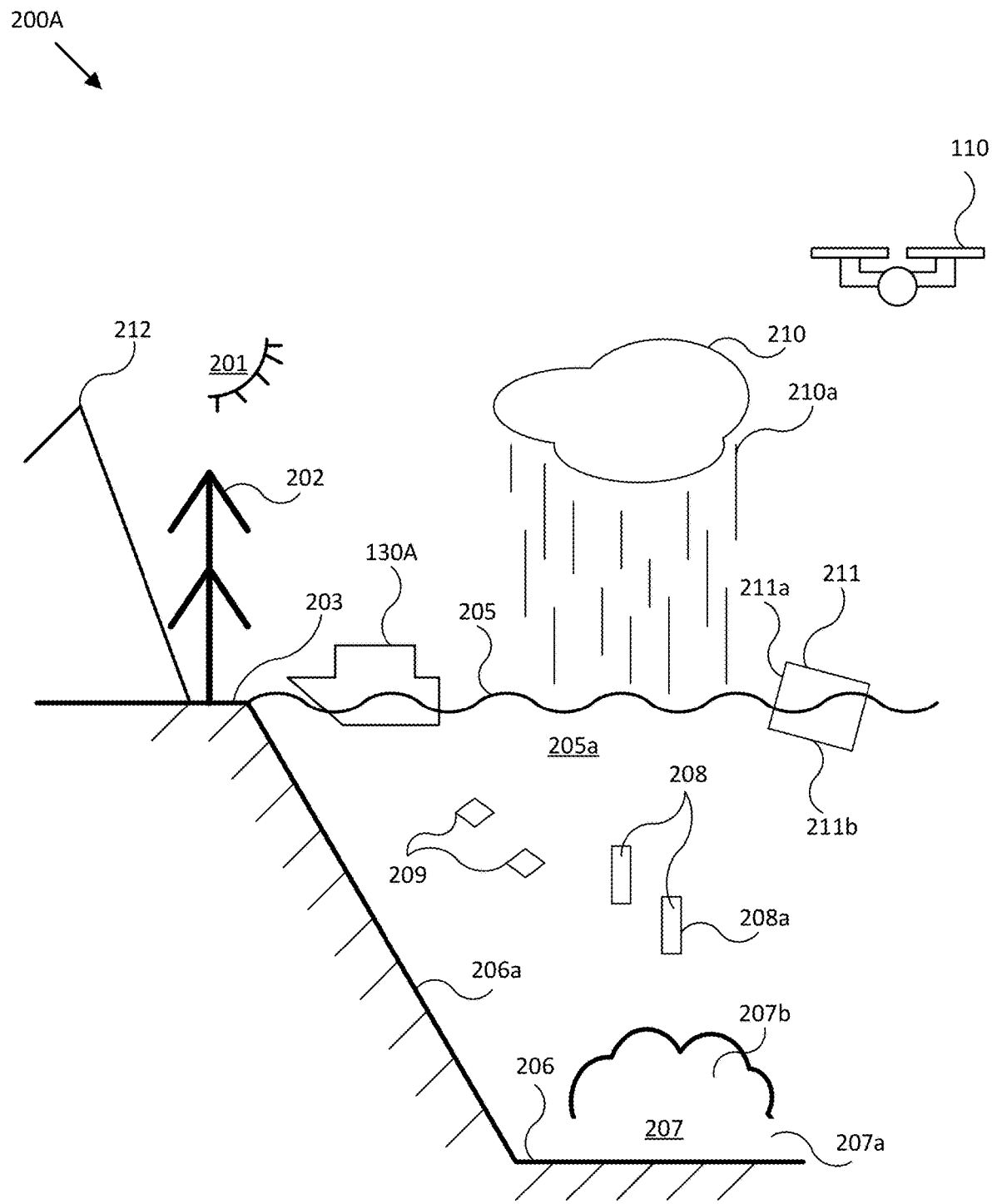
FIG. 2A illustrates a representation of an environment with a mobile structure and an unmanned aerial system in accordance with an embodiment of the disclosure.

FIG. 2A illustrates a representation of an environment with a mobile structure and an unmanned aerial system in accordance with an embodiment of the disclosure. FIG. 2A may include a mobile structure 130A and a UAS 110. One or more imaging modules and/or sensors coupled to UAS 110 and/or mobile structure 130A may image and/or sense a surface of a body of water 205a and various objects or structures above waterline 205, such as the sun 201, a tree 202, a beach 203, a hill 212, cloud 210, rain 210a, and/or floating object 211 or floating object 211a (the part of the floating object 211 above the waterline). Such imaging modules and/or sensors may output or otherwise provide data associated with such objects. Such objects may be detected via, for example, thermal imaging, visual imaging, radar detection, and/or detection through other modules of UAS 110 and/or mobile structure 130A. Additionally, one or more imaging modules, and/or sensors (e.g., sonar sensors) coupled to UAS 110 and/or mobile structure 130A may image and/or sense various objects and/or structures below 205, such as a floor 206 of body of water 205a, a bank 206a of floor 206, a bottom feature 207 (e.g., a rock or sunken ship), fish 208 (or other fish, game, wildlife, and/or other flora and fauna), other submerged objects 209 (e.g., trash, seaweed), floating object 211b (the part of the floating object 211 below the waterline), and/or other underwater features within or surrounding body of water 205a.

Such data may be processed using feature/pattern recognition techniques. For example, such techniques may be used to determine a location of waterline 205 within image data. Sonar data, which may be provided by bathymetric charts and/or past or current use of sonar system 182 of FIGS. 1A and 1B and/or a sonar system coupled to UAS 110, may include data representative of waterline 205, a floor 206 of body of water 205a, a bank 206a of floor 206, a bottom feature 207 (e.g., a rock or sunken ship), fish 208 (or other fish, game, wildlife, and/or other flora and fauna), other submerged objects 209 (e.g., trash, seaweed), floating object 211b (the part of the floating object 211 below the waterline), and/or other underwater features within or surrounding body of water 205a. Infrared camera 140 of UAS 110 may determine a water temperature and may, for example, determine, via data from infrared camera 140 indicating changes in water temperature of portions of the body water over time, currents and/or changes in water temperature.

Such data may be outputted or provided to controllers 112 and/or 138 and used to determine environmental conditions and/or create a representation of the environment. For example, controllers 112 and/or 138 may determine, from such data, ambient temperature, wind conditions, water temperature, current conditions, humidity, barometric pressure, other weather conditions (e.g., rain, cloud, fog), the presence of objects within the environment (e.g., debris, vehicles, obstacles, and/or other such items), terrain features, presence of flora and/or fauna, position of the sun, moon, and/or other celestial objects, and/or other such features and/or conditions. Such determinations may, for example, aid in the navigation of mobile structure 130A (e.g., in environments where mobile structure 130A may be piloted in shallow waters and/or rivers, current conditions and information about debris and obstacles may be used to ensure that mobile structure 130A safely navigates such shallow water areas).

In certain embodiments, such determinations may be used to generate a point model and/or three-dimensional representation of the environment around mobile structure 130A. In certain other embodiments, the controller 112 and/or 138 may determine a planned and/or likely path for the mobile structure 130A and may determine the presence of environmental conditions (e.g., current conditions, weather conditions, temperature, pressure, and/or other such conditions) and/or objects (e.g., animals, debris, other vehicles, and/or other such objects) that may affect movement of the mobile structure 130A through the planned and/or likely path (e.g., affect the speed, safety, and/or likelihood that mobile structure 130A can travel over the planned and/or likely path). In certain additional embodiments, controller 112 and/or 138 may determine a fastest path for mobile structure 130a to follow from a first position to a second position, responsive to environmental conditions and/or objects detected. Also, in certain other embodiments, controller 112 and/or 138 may be configured to detect specific objects and/or terrain features. As such, for example, controller 112 and/or 138 may receive such data and determine the presence and/or absence of, for example, a person within body of water 205. In certain such embodiments, the presence of the person within body of water 205 may be determined, at least in part, via one or more thermal imaging devices coupled to UAS 110.

A sea state of the body of water 205a may also be determined using data from data including image data. For example, as shown in FIG. 2, waterline 205 may be choppy. Analysis of the visual and/or thermal imaging data may determine the choppiness of waterline 205 and, thus, determine at least a portion of the sea state of body of water 205a. In certain embodiments, such a sea state (e.g., sea calmness or choppiness) may be rendered or communicated within an integrated model by, for example, graphical representations (e.g., animating the sea state in a 2D or 3D manner or through representations of the sea state using sea state indicators) or textual representations (e.g., text describing the sea state or rating the sea state according to a sea state scale such as a numerical scale).

Data from the modules within system 200A or system 100 may be combined within a navigational database. The navigational database may, for example, be contained within memories of controller 112 and/or 138, within other memories, and/or may be communicatively connected to other components within system 100 and/or the system 200A. Such navigational database may receive data from other modules, sensors, imaging systems, or devices that may or may not be coupled with mobile structure 130 and/or UAS 110. For example, navigational database may receive data from a smartphone of a user, from other vehicles, from GNSS satellites, from fixed devices such as traffic control services, from other communications systems such as radios and laser communications, and from cloud based interior database. In certain such embodiments, communications module 120, 144, and/or 154 may transmit and/or receive navigational database and/or data associated with navigational database.

For the purposes of this disclosure, any and all data that may directly or indirectly aid in the navigation of a vehicle may be considered navigational data. Also, the navigational database may combine navigational data of navigational sensors from any or all appropriate sources. The navigational database may also include orientation and/or position data from and/or associated with the navigational sensors. In certain embodiments, the navigational database may receive data from other sensors via communications modules 120, 144, and/or 154.

Such navigational database may, in certain embodiments, be used to aid in navigation of mobile structure 130 by fusing together data from a plurality of sensors. The data may be fused in a manner to aid in the navigation of mobile structure 130 or assist in the presentation of the data to an operator of mobile structure 130 or a user of a display in a manner that may make the presentation easier to understand, more complete, and/or more informative. In certain embodiments, an operator may be a person in operational control of mobile structure 130, while a user may be a person in control of an electronic device that may contain the display. The operator and/or the user may be the same person or may be different people.

For example, the navigational database may include data from sonar system 182, infrared camera 140, imaging module 142, visible spectrum imaging modules, orientation sensor 180, radar, and/or other navigation sensors of system 200A. Controller 112 and/or 138 may be configured to generate an integrated model from at least some of the data within navigational database. Such an integrated model may be, for example, a 2D or 3D representation of an environment near mobile structure 130. The integrated model may present the environment from substantially the point of view of the viewer of the vehicle (e.g., from the point of view of a bridge of a watercraft or from the point of view of where an imaging sensor may be located), from a top down point of view, from a perspective or angled view, or from a free-form view (i.e., where a user may select a viewpoint).

In certain embodiments, the integrated model may combine data from multiple sensors into one view. Such an integrated model may include a rendering of a virtual representation of the environment (e.g., render the environment from scratch, such as with a full 3D model) or may use data from one or more sensors as a base view and render additional data "on top" of the base view, such as in an overlay with variable transparency, for instance.

For example, data from a visible spectrum imaging module may be selected for the base view and data from an infrared imaging module, a sonar system, and/or a radar may be rendered "on top" of the base view. In certain embodiments, one or more of such modules may be coupled to UAS 110. Accordingly, the base view may be a visual view from the visible spectrum imaging module. Due to rain 210a, the visible spectrum imaging module, which may be coupled to mobile structure 130A, may not be able to detect floating object 211 behind rain 210a. However, UAS 110 may be able to detect floating object 211. Thus, data from UAS 110 may supplement and/or be combined with data from mobile structure 130A and an integrated model may be generated with such data. In certain embodiments, the integrated model may overlay radar and/or thermal image data over visual spectrum data. Such models may be presented to a user and/or operator of the mobile via, for example, user interface 132. Accordingly, an operator/user may be aware of the presence of floating object 211 even though floating object 211 may not be visible and/or detectable by modules of mobile structure 130A.

In other embodiments, UAS 110 may detect weather conditions such as, for example, determining an intensity of rain 210a or any other weather feature (such as the density of any fog and/or cloud). UAS 110 may communicate data associated with weather conditions to mobile structure 130A. Such data may, for example, aid in navigation of mobile structure 130A. Also, UAS 110 and/or mobile structure 130A may determine a position of sun 201. The determined position of sun 201 may be used to aid in correction of any environmental data obtained by UAS 110 and/or mobile structure 130A. As such, for example, irradiance and/or thermal values obtained by thermal imaging modules may be modified responsive to the position of sun 201. The controller 112 and/or 138 may, for example, determine the position of the sun 201 relative to an object imaged and correct for any effect the position of the sun 201 may have on irradiance and/or thermal values obtained.

Additionally or alternatively, features detected by modules of UAS 110 and/or mobile structure 130A may be incorporated into the integrated model. For example, sonar systems of UAS 110 and/or mobile structure 130A may detect and/or output or provide data representative of waterline 205, floor 206 of body of water 205a, bank 206a of floor 206, bottom feature 207 (e.g., a rock or sunken ship), fish 208, other submerged objects 209 (e.g., trash, seaweed), floating object 211b, and/or other underwater features within or surrounding body of water 205a. Such underwater features may be rendered within the integrated model. Such underwater features may be indicated and/or differentiated within the integrated model from, for example, features above the water line through use of any combination of contour lines, color and/or greyscale mapping and/or shading, three dimensional rendering, and/or other volumetric rendering techniques. In some embodiments, surface orientations of various underwater features (e.g., of side 207a or top 207b of bottom feature 207, or of side 208a of fish 208) may be detected and/or differentiated using similar sonar data and/or image processing techniques. For example, in certain such embodiments, mobile structure 130A may be a fishing vessel. UAS 110 may search for fish 208 and transit data to mobile structure 130A that may alert the operator of mobile structure 130A to the presence of fish. Additionally, orientations of fish 208 may be determined and such orientations may be factor considered for a forecast of future positions of such fish 208. As such, projected future positions of fish 208 may be communicated to an operator of mobile structure 130A to aid in catching and/or viewing fish 208. In certain such embodiments, controller 112 and/or 138 may forecast future positions at a plurality of time points, determine time required for mobile structure 130A to reach such positions, and suggest a path, orientation, velocity, and/or other pilot factorings to meet such fish 208.

Figure 2B:
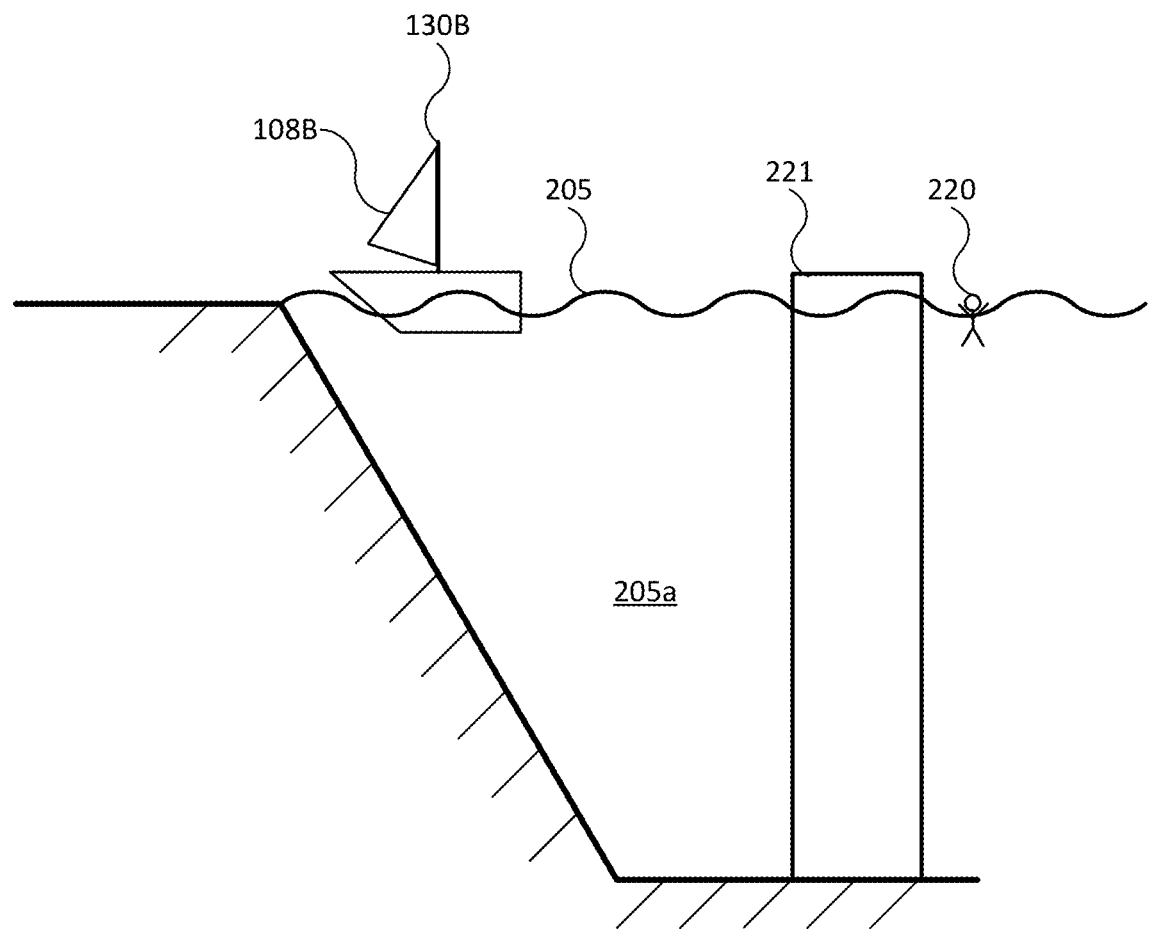
FIG. 2B illustrates another representation of an environment with a mobile structure and an unmanned aerial system in accordance with an embodiment of the disclosure.

FIG. 2B illustrates another representation of an environment with a mobile structure and an unmanned aerial system in accordance with an embodiment of the disclosure. FIG. 2B may include a mobile structure 130B, a body of water 205a with a waterline 205, a fixed structure 221, a UAS 110, and a person 220.

In FIG. 2B, mobile structure 130B may be a mobile structure with a sail 108B. The sail 108B may be a propulsion system for mobile structure 130B. In certain embodiments, UAS 110 may be configured to image and/or other acquire data associated with sail 108B. As such, UAS 110 may, for example, acquire data that may allow for determination of wind strength and/or direction via imaging sail 108B. For example, an imaging module of UAS 110 may acquire one or more images and/or video of sail 108B. Such images may be used to determine wind strength (e.g., from how "full" sail 108B is) and/or wind direction (from a direction that sail 108B is billowing). In other embodiments, UAS 110 may be configured to determine and/or provide an estimated wind strength and/or direction based, at least in part, on rotor speeds and/or tilts (e.g., and/or other propulsion characteristics provided by propulsion system 124) required to maintain a particular absolute position (e.g., provided by GNSS 118).

Additionally, UAS 110 may image and/or other acquire data associated with mobile structure 130B. Such data may be used to, for example, identify concern areas of mobile structure 130B. As such, such images and/or data may identify, for example, damaged areas of mobile structure 130B, wildlife on mobile structure 130B (e.g., barnacles), a configuration of mobile structure 130B (e.g., distribution of items such as cargo on mobile structure 130B, a sail configuration, information associated with a propulsion system of mobile structure 130B, and/or other such configurations). Areas identified may be highlighted by, for example, user interface 132 via text message (e.g., "Hull damaged"), through highlights on a virtual representation, through overlays on images, and/or through other techniques.

UAS 110 may also image the environment surrounding mobile structure 130B and/or a portion thereof. As such, UAS 110 may image body of water 205a and/or portions thereof. In certain embodiments, UAS 110 may aid in, for example, searching for objects and/or persons within body of water 205a. For example, mobile structure 130B may be searching for person 220. Person 220 may be located behind fixed structure 221 (e.g., a portion of a dock or another such fixed structure). As such, mobile structure 130B may fail to detect the presence of person 220 due to blocked line of sight. UAS 110 may detect the presence of person 220 with, for example, a thermal imaging module (e.g., by identifying an object of higher temperature than that of body of water 205a), a visual imaging module (e.g., via image recognition software), radar, sonar, and/or other techniques. In certain such embodiments, data from the UAS 110 may be analyzed to identify currents and/or other environmental factors, a likelihood of location of person 220 within the environment may be determined from other environmental factors, and a search path of a UAS 110 may be planned from such determination (e.g., UAS 110 may be configured to search areas of the highest likelihood first, may follow determined according to current conditions, and/or may follow other such search instructions).

Figure 2C:
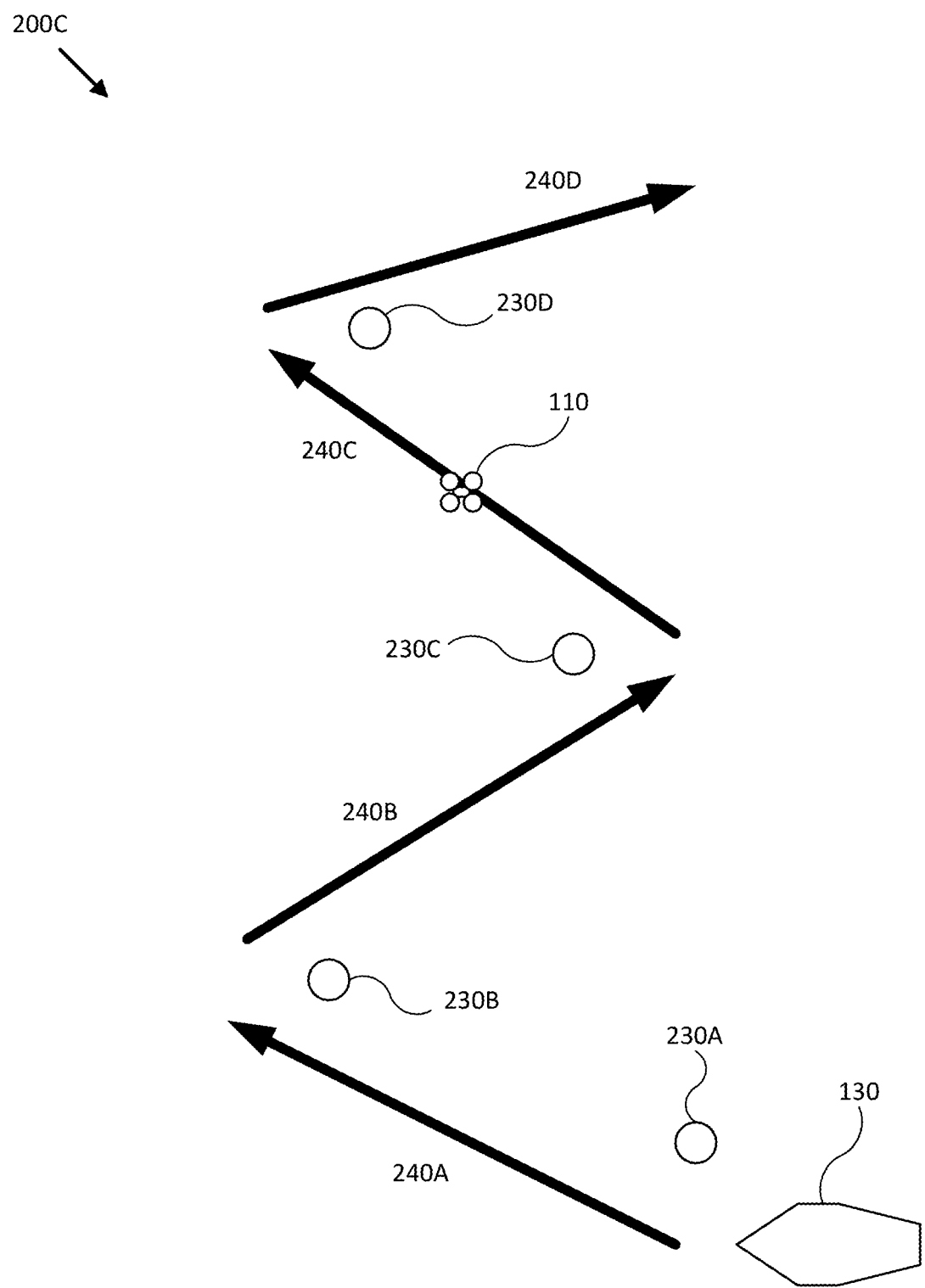
FIG. 2C illustrates a representation of a navigating environment with a mobile structure and an unmanned aerial system in accordance with an embodiment of the disclosure.

FIG. 2C illustrates a representation of a navigating environment with a mobile structure and an unmanned aerial system in accordance with an embodiment of the disclosure. FIG. 2C may include a mobile structure 130. Mobile structure 130 may be navigating past waypoints 230A-D. In certain embodiments, mobile structure 130 may, for example, be participating in a race and waypoints 230A-D may be points that mobile structure 130 may be required to navigate around. In such an embodiment, mobile structure 130 may, for example, be preliminarily instructed to follow paths 240A-D. UAS 110 may then be deployed to acquire data associated with at least a portion of paths 240A-D. For example, UAS 110 may acquire data associated with water temperature, current conditions, obstacles, debris, location of other mobile structures, location of animals and/or persons, and/or other such information. Such data may, for example, be transmitted to mobile structure 130 and/or analyzed or used to determine an updated route for mobile structure 130. Such an updated route may, for example, be a quickest possible route for mobile structure 130 to travel around waypoints 230A-D. In other embodiments, UAS 110 may be configured to detect potential obstacles (e.g., objects that may damage mobile structure 130) within paths 240A-D. Detection of such objects may be communicated to an operator and/or user (e.g., via user interface 132), may cause mobile structure 130 to alter path (e.g., an autopilot system of mobile structure 130 may adjust a planned path), may be communicated to a third party (e.g., Coast Guard or other vessel), and/or may be communicated and/or reacted to through other techniques.

Figure 2D:
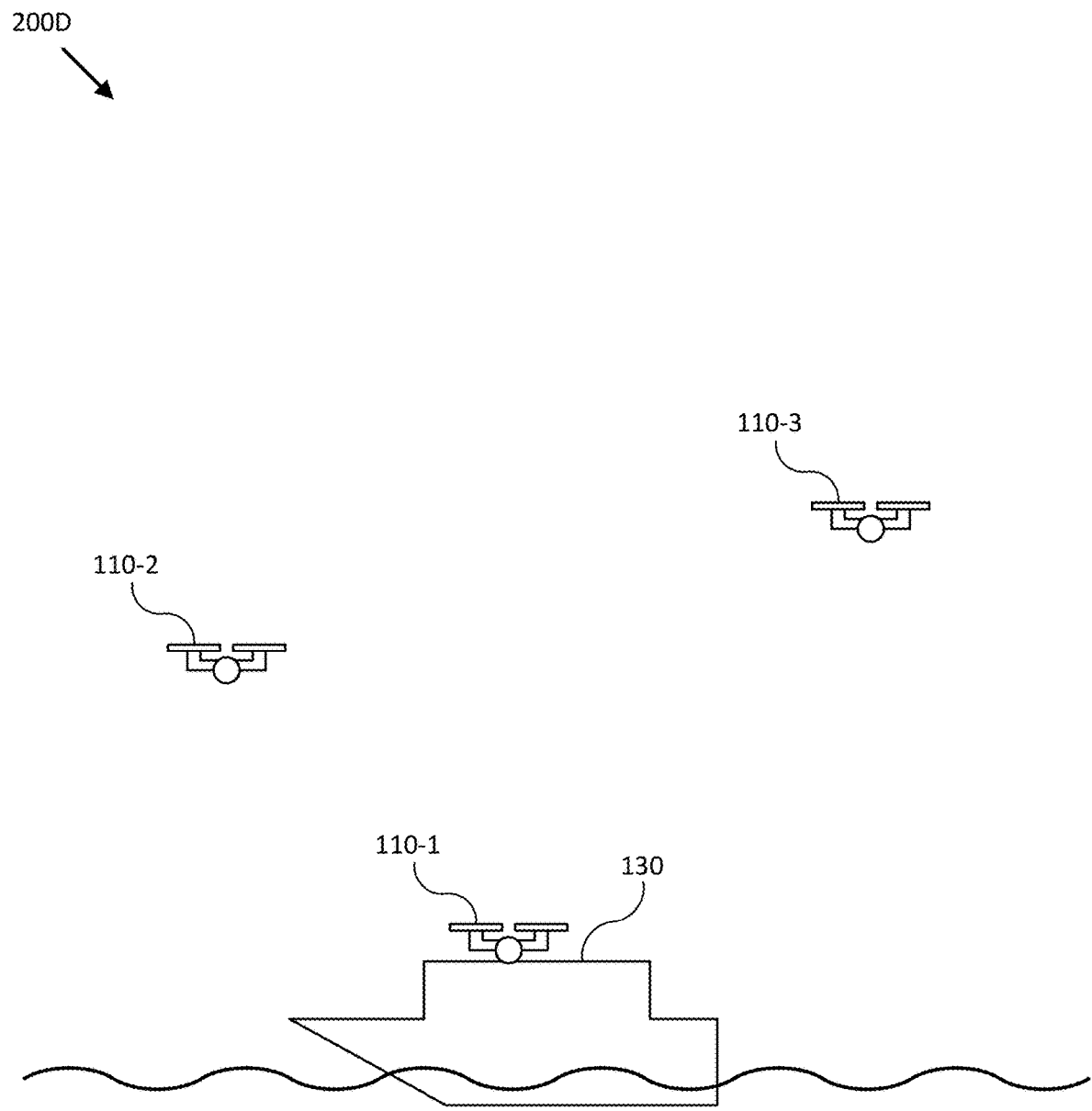
FIG. 2D illustrates a representation of a mobile structure with a plurality of associated unmanned aerial systems in accordance with an embodiment of the disclosure.

FIG. 2D illustrates a representation of a mobile structure with a plurality of associated unmanned aerial systems in accordance with an embodiment of the disclosure. In FIG. 2D, mobile structure 130 may be associated with a plurality of UASs 110-1 to 110-3. Each of the plurality of UASs 110-1 to 110-3 may, for example, be stored and/or maintained on mobile structure 130. Mobile structure 130 may launch one or more of UASs 110-1 to 110-3 at any point in time to, for example, aid in navigation, route planning, object detection, and/or other tasks performed by mobile structure 130.

Mobile structure 130 may simultaneously receive data from a plurality of UASs 110-1 to 110-3. Additionally, mobile structure 130 may provide instructions to the plurality of UASs 110-1 to 110-3. Each of UASs 110-1 to 110-3 may receive unique instructions (e.g., each of UASs 110-1 to 110-3 may be instructed to fly over a specific area different from where other UASs are instructed to fly over).

In certain embodiments, mobile structure 130 may include one or a plurality of flight platform receivers 190. In embodiments where mobile structure 130 may include a lesser amount of flight platform receivers 190 than UASs 110-1 to 110-3 (e.g., less than three), controller 112 and/or 138 may manage UASs 110-1 to 110-3 such that only a number of UASs less than or equal to the number of flight platform receivers 190 may be interfacing with mobile structure 130 at any one time. As such, if there are two flight platform receivers 190, controller 112 and/or 138 may provide instructions such that at least one UAS is aloft so that at most only two UASs are interfacing with mobile structure 130. In certain such embodiments, controller 112 and/or 138 may calculate an interface time for each UAS (e.g., the amount of time each UAS is required to interface with the platform receiver 190 to recharge and/or transfer data). Controller 112 and/or 138 may schedule the time periods where flight platform receivers 190 interface each of the UASs 110-1 to 110-3 to, for example, prevent any one UAS from running out of electrical charge and/or memory.

In certain other embodiments, one or more of UASs 110-1 to 110-3 may be configured to image one or more of a passenger and/or crew of mobile structure 130. In certain such embodiments, the UASs may determine environmental conditions and select an imaging location (e.g., position relative to the passenger and/or crew and/or altitude) responsive to the environmental conditions. For example, the position of the sun may be determined and a position selected responsive to, at least the position of the sun (e.g., to minimize wash-out from the sun). Other embodiments may, for example, detect the presence of objects of interest (e.g., rock formations, coral, wildlife, and other such objects) and select a position responsive to such determinations (e.g., select a position that may allow for one or more of the passenger and the object of interest to be shot in the same frame) as well as perform other determinations to increase the quality of images.

Figure 3:
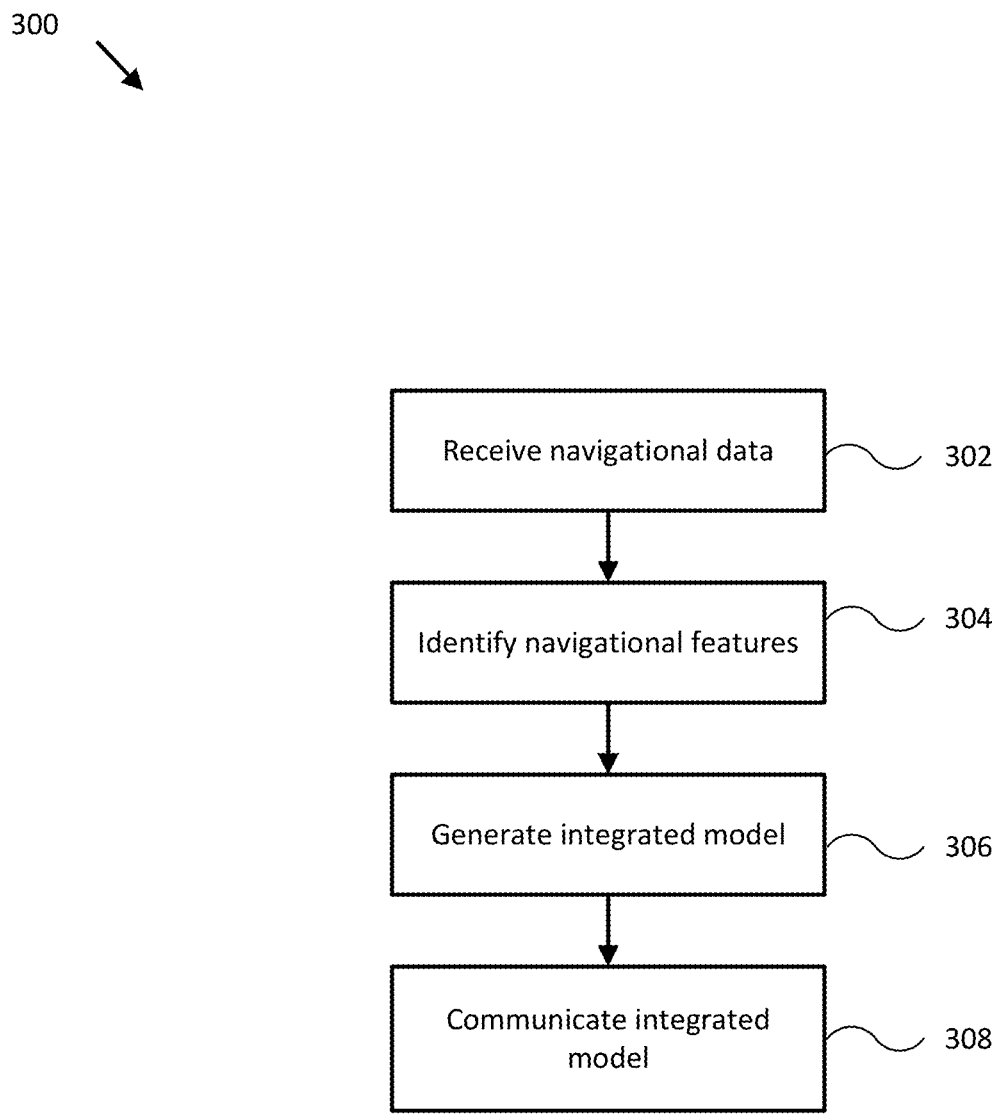
FIG. 3 illustrates a flow diagram detailing generation of an integrated model in accordance with an embodiment of the disclosure.

FIG. 3 illustrates a flow diagram detailing generation of an integrated model in accordance with an embodiment of the disclosure. The technique illustrated in FIG. 3 may be performed by, for example, one or more controllers such as controller 112 and/or 138 of flight platform 110 and/or mobile structure 130.

In block 302, navigational data may be received from, for example, one or more UASs. The navigational data may include data associated with an environment around the mobile structure, including weather data, sonar data, radar data, temperature data, visual imaging data, and/or other such data. Navigational data from the one or more UASs may be received by the mobile structure wirelessly (e.g., via a WiFi, optical, BlueTooth, 2G, 3G, 4G, WLAN, IEEE standards, LTE, Personal Area Network, ZigBee, Wireless USB, and/or other such wireless data connections), through wires, and/or through couplings (e.g., data couplings within the UAS and, for example, a flight platform receiver 190).

In block 304, navigational features may be identified from the navigational data. Navigational features may be any feature within the environment that may affect the piloting of the mobile structure and/or performance of a task by the mobile structure. For example, other mobile structures, obstacles (e.g., rocks, embankments, barriers, buoys, structures, and/or other obstacles), wildlife, people, environmental conditions, terrain features, and/or other features may be identified.

In block 306, an integrated model may be generated. In certain such embodiments, the integrated model may be a representation of the environment around the mobile structure such as a three-dimensional representation, a two-dimensional representation, text communicating features, an overlay, and/or other such representations.

In block 308, the integrated model may be communicated to an operator and/or user. The integrated model may be communicated by, for example, a graphical representation, an audio message, a message to a secondary device, and/or other such techniques.

Figure 4:
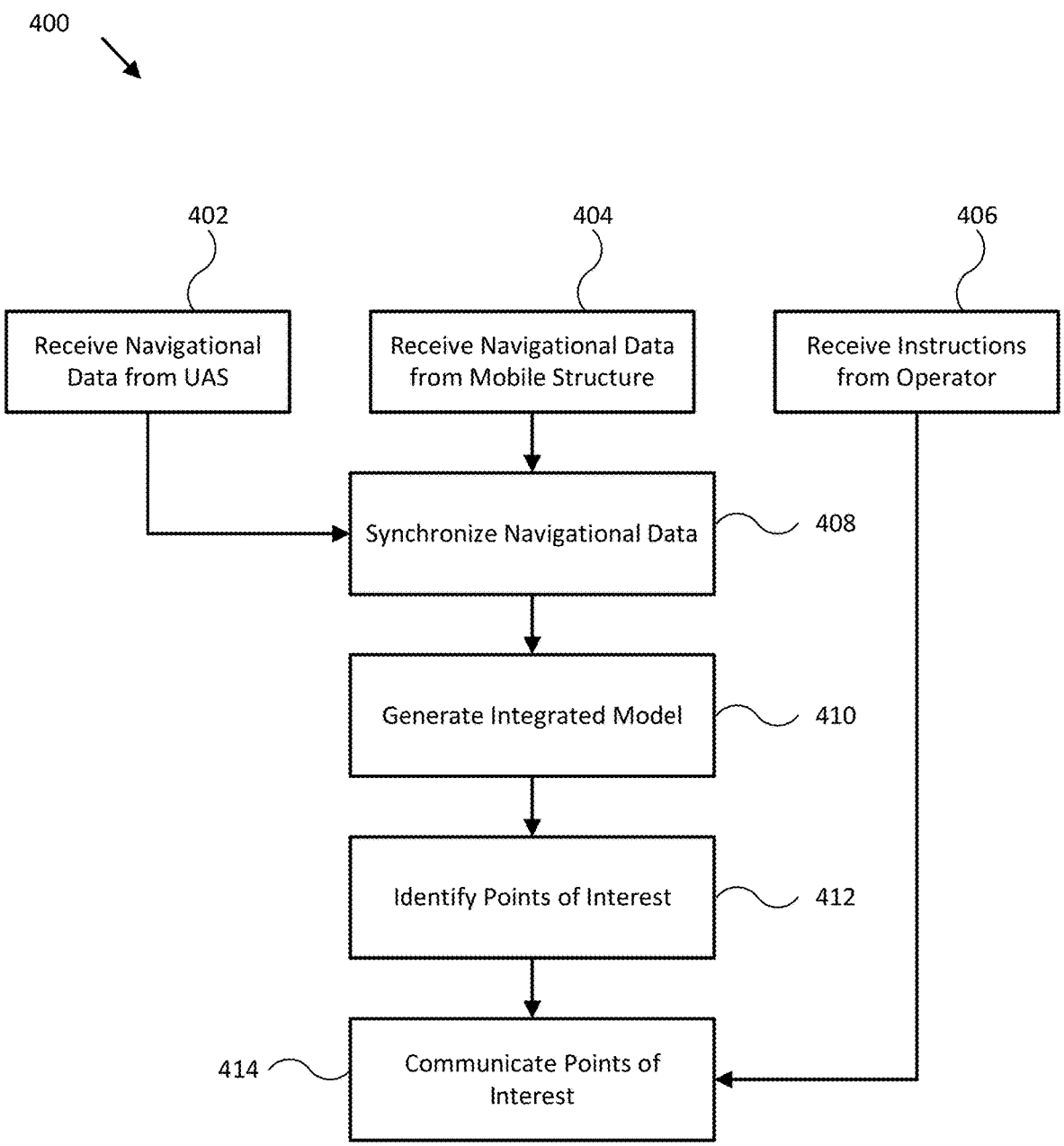
FIG. 4 illustrates a flow diagram of identifying and communicating points of interests using sensors of a mobile structure and an unmanned aerial system in accordance with an embodiment of the disclosure.

FIG. 4 illustrates a flow diagram of identifying and communicating points of interests using sensors of a mobile structure and an unmanned aerial system in accordance with an embodiment of the disclosure.

In block 402, navigational data may be received from one or more UASs. Navigational data may be received in block 402 in a similar manner to that described in block 302 of FIG. 3. In block 404, navigational data may be received from the mobile structure. Navigational data may include, for example, visual image data, thermal image data, radar data, sonar data, and/or other such data acquired by one or more modules of the mobile structure.

In block 408, navigational data from the one or more UASs and from the mobile structure may be synchronized. For example, each of the one or more UASs and the mobile structure may, for example, acquire radar data of objects above a waterline. Such objects may include, for example, rocks within the vicinity of the mobile structure. Additionally, the one or more UAS may detect, via thermal image data, the presence of a person within the water near one of the rocks. The mobile structure may not have line of sign to the person and so may not detect the person. Data from the UAS and the mobile structure may be synchronized by, for example, matching the locations of rocks detected by the UAS to locations of the same rocks detected by the mobile structure. The location of the person relative to the mobile structure may then be determined from the synchronized data.

In block 410, an integrated model may be generated with the synchronized data. As such, for an integrated model that is a three-dimensional representation of the surrounding environment, the integrated model may display only one set of the rocks. In certain embodiments, such as embodiments where only one of the UAS and/or the mobile structure includes data detecting an item within the environment around the mobile structure, the integrated model may still generate a representation of such items. As such, in the above example, a representation of the person may still be generated.

In block 412, points of interest may be identified and/or communicated. The points of interest may be visually identified, verbally identified, and/or identified through another technique. For example, in a visual integrated model, the point of interest may be highlighted, may be pointed out (e.g., via an arrow pointing towards it), and/or may be highlighted through another technique. In the example above, the location of the person may be highlighted within the integrated model. In block 414, the identified points of interest may be communicated via, for example, user interface 132 through highlights on an integrated model and/or other such techniques.

In block 406, instructions from the operator may be received. Such instructions may be received responsive to, for example, outputs from the integrated model. Instructions may include, as illustrative examples, instructions to travel to a location, instructions to launch one or more UASs (e.g., to investigate a location), instructions to transmit information to a third party (e.g., transmit a distress signal to the Coast Guard), and/or other such instructions. In certain embodiments, one or more UASs may relay such instructions to another entity (e.g., one or more UASs may receive instructions from the mobile structure and transmit such instructions to the Coast Guard). As such, the one or more UASs may improve transmission ranges of the mobile structure, such as when line of sight obstructions and/or other potential transmission impediments are present. In the above example, instructions may be received to communicate the presence of the person to the Coast Guard. The UAS may receive the instructions from the mobile structure and transmit it to the Coast Guard. Rescue operations may then be accordingly scheduled. More generally, one or more UASs may be configured to send or receive instructions and/or sensor information to a shore base or Coast Guard installation or ship through mobile structure 101, in order to leverage the stronger transmission power typically provided by mobile structure 101.

Figure 5:
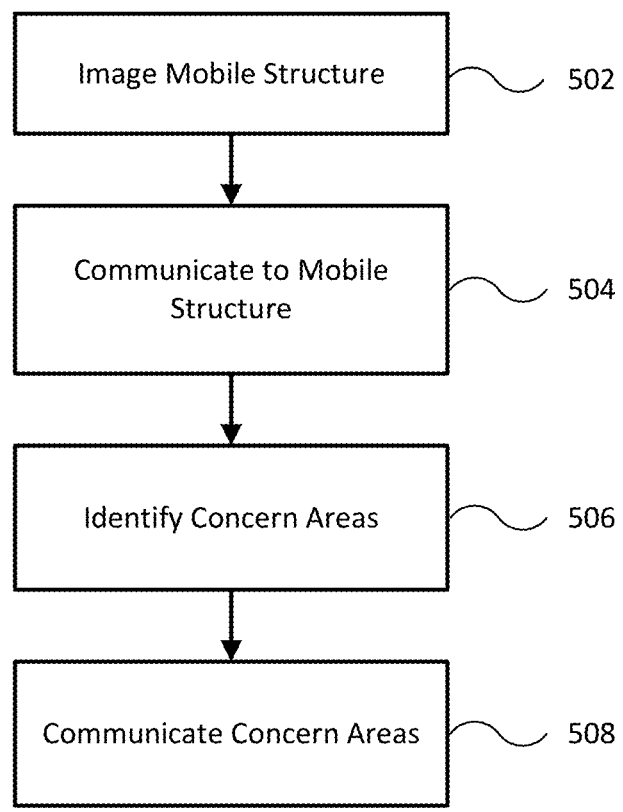
FIG. 5 illustrates a flow diagram of identifying concern areas in accordance with an embodiment of the disclosure.

FIG. 5 illustrates a flow diagram of identifying concern areas in accordance with an embodiment of the disclosure. In block 502, portions of the mobile structure may be imaged and/or otherwise captured through one or more modules of one or more UASs. The images and/or data captured by the UASs may be communicated to the mobile structure in block 504. After data has been communicated, the data may be analyzed by controller 112 and/or 138, other modules, and/or displayed to the operator and/or user to identify areas of concern in block 506. Such areas of concern may include, for example, areas of structural concern, wildlife on the mobile structure, areas that may require maintenance, a configuration of the mobile structure that may change responsive to the environment (e.g., a flap angle and/or a sail configuration). The areas of concern may be communicated in block 508. The operator and/or user may respond accordingly by, for example, correcting problems, changing a configuration of the mobile structure, scheduling maintenance and/or repairs, investing the area of concern, and/or performing other such actions.

Figure 6:
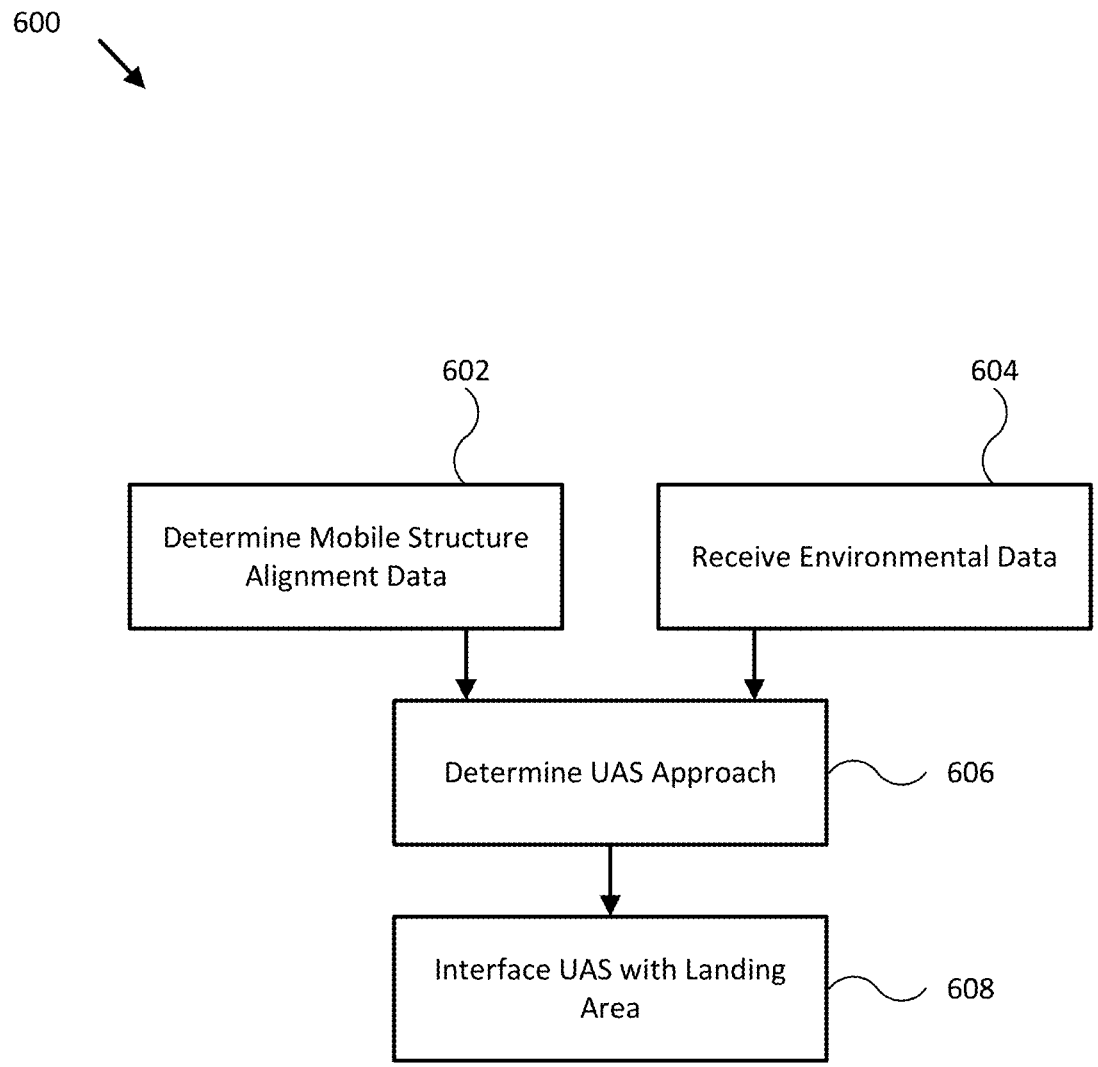
FIG. 6 illustrates a flow diagram of interfacing an unmanned aerial system with a mobile structure in accordance with an embodiment of the disclosure.

FIG. 6 illustrates a flow diagram of interfacing an unmanned aerial system with a mobile structure in accordance with an embodiment of the disclosure. In block 602, an alignment of the mobile structure may be determined. In certain embodiments, the UAS may, for example, image and/or otherwise acquire data to determine alignment of the mobile structure. For example, the UAS may image a flight platform receiver of the mobile structure and/or may receive signals from a plurality of portions of the flight platform receiver to determine an orientation of the flight platform receiver relative to the position of the UAS. Additionally, any movement of the mobile structure (e.g., heading, velocity, drift, heave, sway (e.g., roll, pitch, and/or yaw), and/or other such movement) may also be determined in block 602.

In block 604, environmental data may be determined and/or received. Such environmental data may include, for example, wind direction, wind speed, particulate and/or precipitation data, and/or other data directed to other such environmental conditions.

A UAS approach (e.g., a heading, speed, direction, path, and/or other such movement factor) may be determined from the mobile structure alignment data and environmental data in block 606. Such approaches may include instructions for the UAS to, for example, change direction, orient the UAS to line up with features of the flight platform receiver, determine a speed of approach, determine a rate of altitude drop and/or gain, and/or other such instructions to allow the UAS to interface with the flight platform receiver. Such instructions may compensate for, for example, the sway of the mobile structure and/or any wind and/or weather conditions (e.g., the UAS may be timed to interface with the flight platform receiver taking into account the sway of the mobile structure). The approach may be communicated to the UAS and the UAS may then interface with the flight platform receiver and/or another landing area of the mobile structure in block 608.

Embodiments of the present disclosure may be used to facilitate interoperability of UAS 110 with mobile structure 101 and/or a user of mobile structure 101, such as interoperability used to ease implementation of any of the imaging techniques and methodologies described herein. For example, in some embodiments, embodiments of imaging system 100 may be configured to facilitate landing UAS on mobile structure 101 while mobile structure 101 is underway. Typically, autopiloted landing of a UAS assumes a landing surface that is horizontal and stationary. By contrast, a landing surface on a moving mobile structure, such as a watercraft, may be moving laterally or longitudinally, heaving vertically, and rolling and/or pitching. In various embodiments, system 100 may be configured to monitor such motion (e.g., using sensors 162, 164, 166, and/or 180 coupled to mobile structure 101) and provide measurements of such motion to UAS/flight platform 110 in real time (e.g., using communication modules 154 and 120) as it attempts to land on flight platform receiver 190. For example, controller 112 of flight platform 100 may be configured to receive such measurements and compensate for such motion while attempting to land on flight platform receiver 190.

In some embodiments, controller 112 may be configured to control propulsion system 124 to substantially match the measured motion of mobile structure while reducing a relative altitude to flight platform receiver 190, until contact/landing. In other embodiments, controller 112 may be configured to determine a periodicity of such motion (e.g., based on a time series of the measured motion), for example, and determine an estimated future landing time and/or position of flight platform receiver 190 corresponding to a relatively stable period in the periodic motion (e.g., such as a peak of a periodic or otherwise characterizable heaving motion of mobile structure 101) and control propulsion system 124 to maneuver flight platform 110 to the determined estimated future landing position at the determined estimated future landing time and land flight platform 110 on flight platform receiver 190. In various embodiments, controller 112 may be configured to combine motion measurements of mobile structure 101 with concomitant measurements of the position and/or motion of flight platform 101 (e.g., absolute, or relative to flight platform receiver 190 and/or mobile structure 101) in order to determine a landing maneuver to land lightly (e.g., without causing damage to flight platform 110 and/or flight platform receiver 190).

Figure 7:
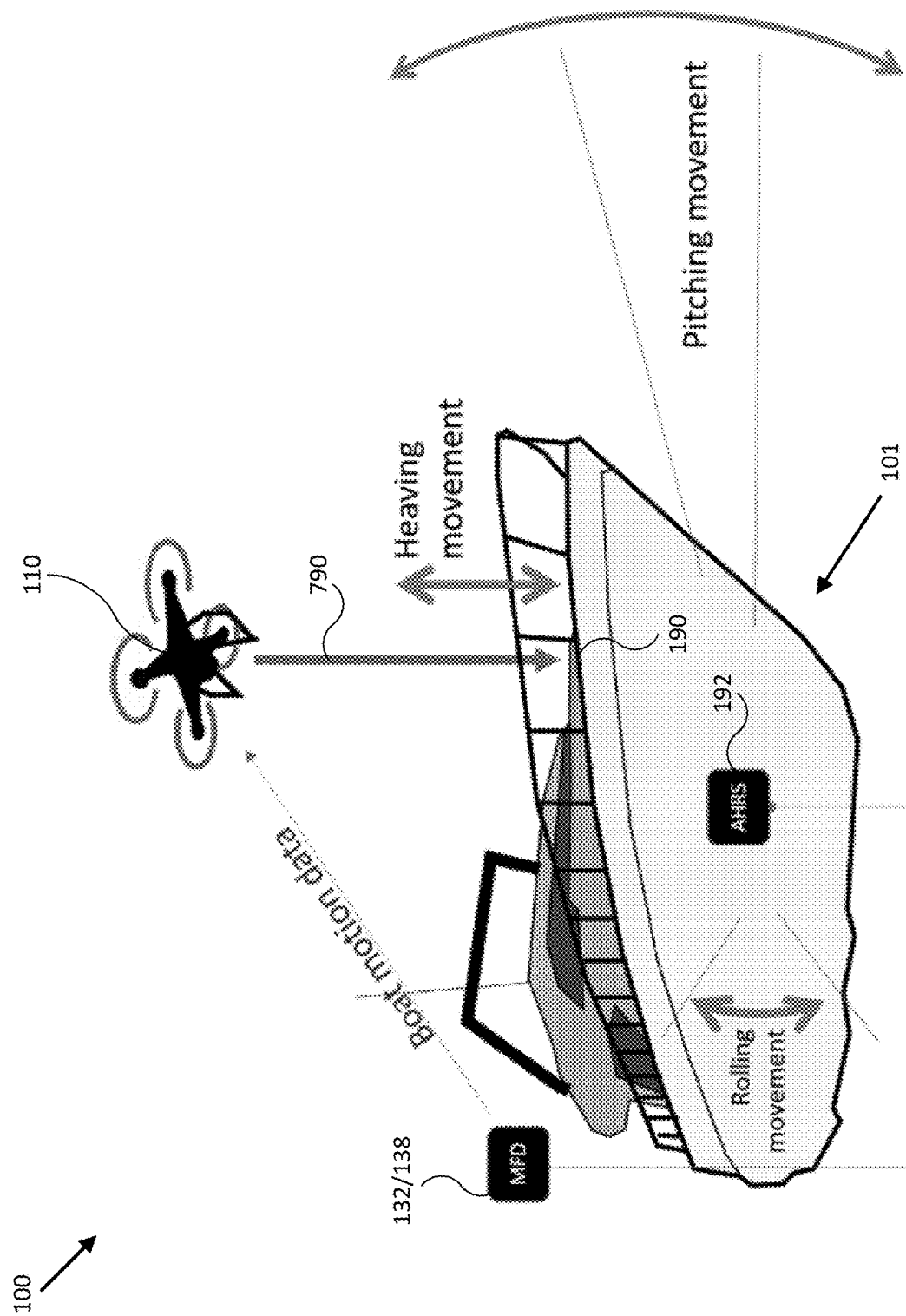
FIG. 7 illustrates a mobile structure with an associated unmanned aerial system in accordance with an embodiment of the disclosure.

For example, FIG. 7 illustrates mobile structure 101 with an associated UAS/flight platform 110 in accordance with an embodiment of the disclosure. As shown in FIG. 7, user interface 132/controller 138 (e.g., which may be implemented as a multi-function touch display, or MFD) of system 100 may be configured to receive motion measurements from sensor cluster 192 (e.g., an attitude and heading reference system, or AHRS) coupled within mobile structure 101, including rolling, pitching, and/or heaving movements of mobile structure 101, for example, and to provide the motion measurements to UAS/flight platform 110. Controller 112 of flight platform 110 may be configured to use such measurements to determine a landing maneuver/path 790 that compensates for motion of mobile structure 101, for example, and to control UAS/flight platform 110 to follow landing maneuver/path 790 to land on flight platform receiver 190.

In another example of facilitating interoperability of UAS 110 with mobile structure 101 and/or a user of mobile structure 101, in some embodiments, embodiments of imaging system 100 may be configured to facilitate conducting an aerial search using one or more flight platforms 110, launched from and retrieved by mobile structure 101, and coordinating the search among the one or more flight platforms 110, according to a general search pattern or plan, and/or with additional mobile structures and/or associated UASs/flight platforms 110. For example, in some embodiments, user interface 132 and/or controller 130 may be configured to render a display view to facilitate a number of various search operations, such as: creating one or multiple search patterns; transmitting such search patterns to one or more flight platforms 110; monitoring, determining/estimating, and/or displaying flight platform positions, altitudes, individual and/or aggregate search pattern completion percentages, time of/to start of a particular search pattern, time of/to completion of a particular search pattern, and/or other search operation characteristics corresponding to flight platforms participating in a particular search operation; alerting a user to a search pattern completion and presenting the option to assign and/or begin traversing another search pattern; alerting a user to potential targets detected by the one or more flight platforms; displaying imagery of such potential targets to a user; alerting a user if mobile structure 101 is maneuvered beyond a return range of a flight platform; presenting an option to pause/abort/divert a particular flight platform from an assigned search pattern to allow manual control of the flight platform; presenting one or more live imagery feeds from onboard cameras associated with the one or more flight platforms; and storing a datalog of events, feeds, actions, and/or corresponding times associated with the one or more flight platforms and/or the search operations for use in post-event analysis, for example. In various embodiments, such search patterns may be defined as geostationary, for example, or may defined as positioned relative to a current/updating position and/or orientation of mobile structure 101.

Figure 8:
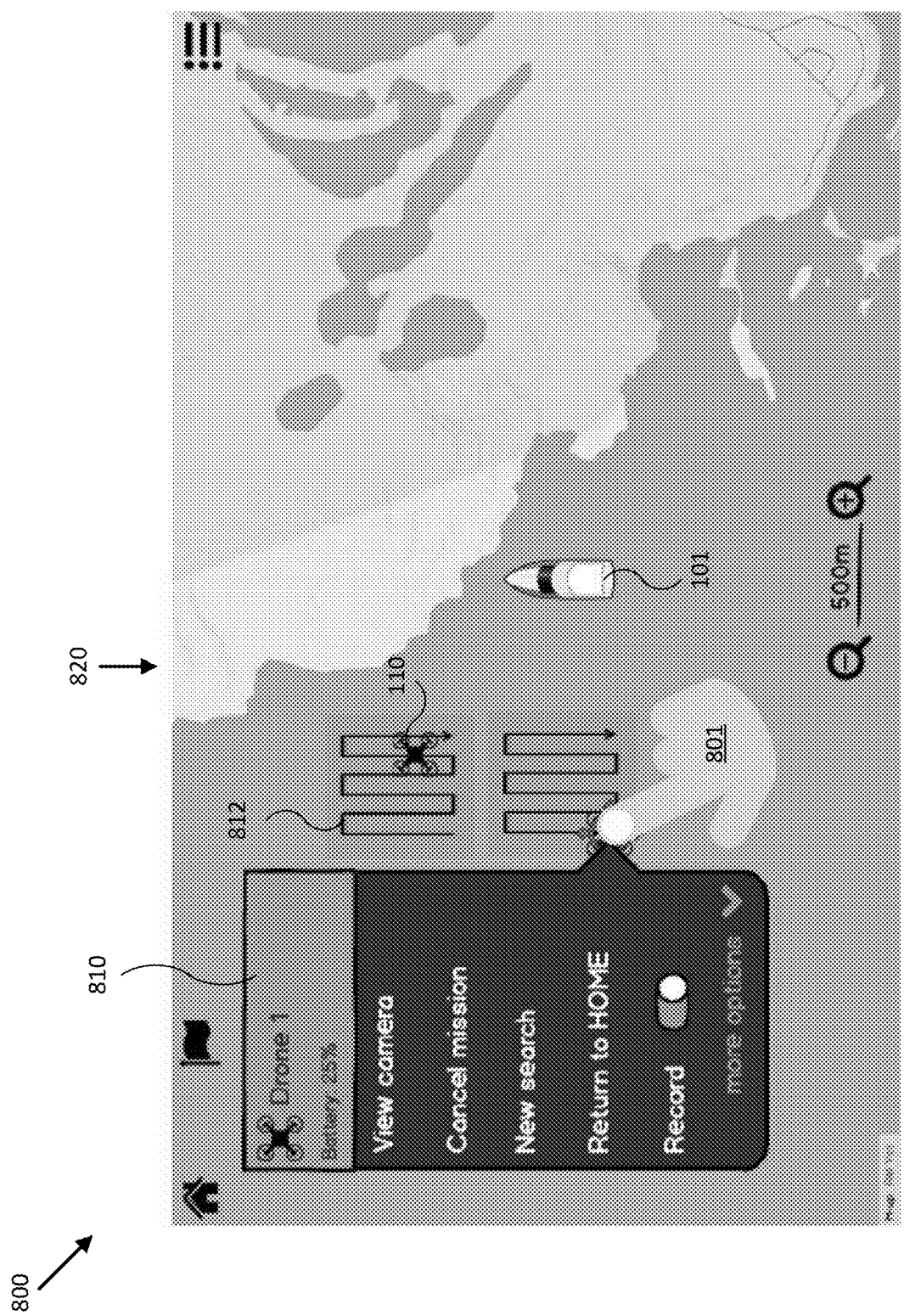
FIG. 8 illustrates a display view to facilitate search operations using a mobile structure and an associated unmanned aerial system in accordance with an embodiment of the disclosure.
Figure 9:
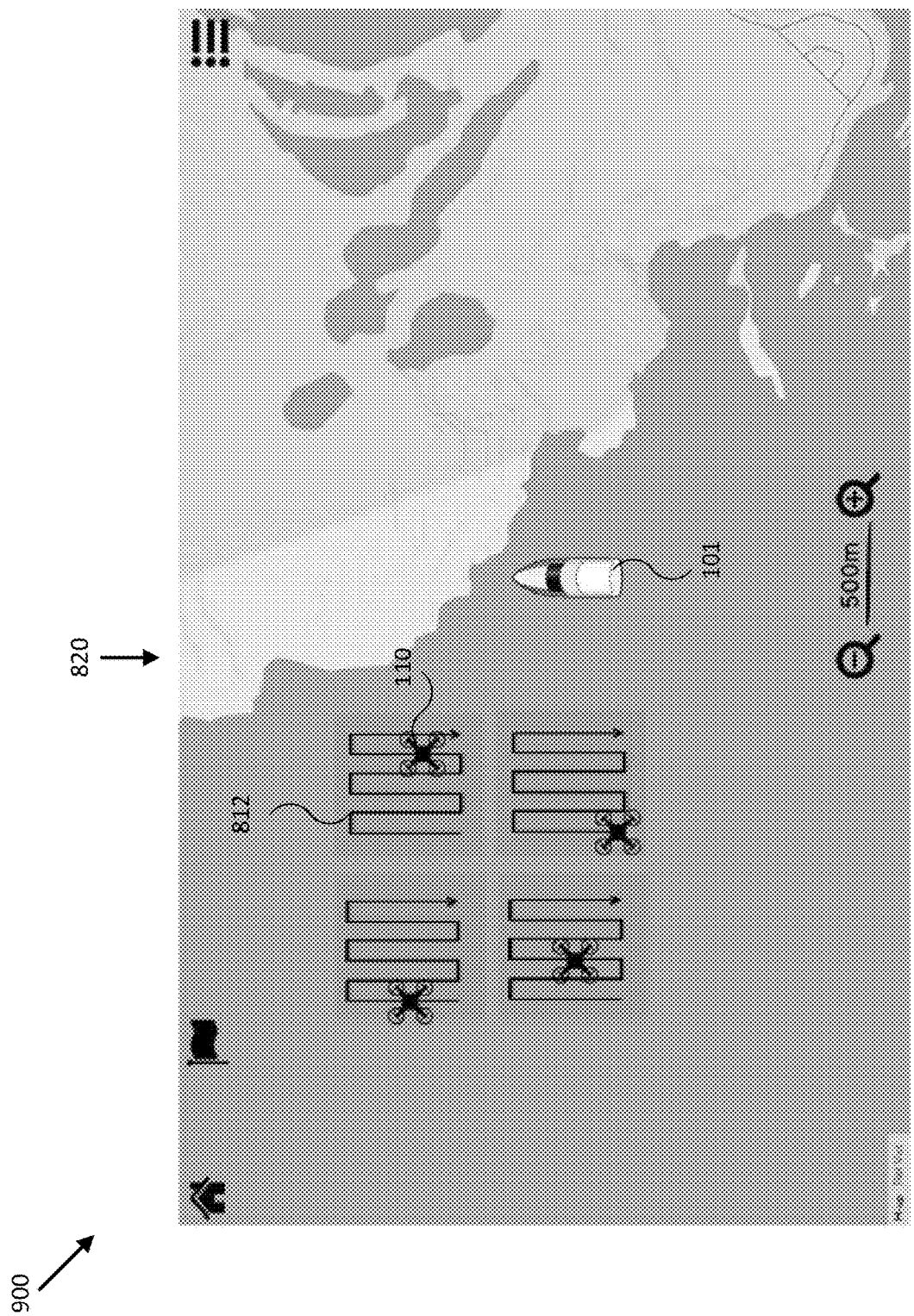
FIG. 9 illustrates a display view to facilitate search operations using a mobile structure and an associated unmanned aerial system in accordance with an embodiment of the disclosure.

For example, FIGS. 8-9 illustrate display views 800 and 900 to facilitate search operations using mobile structure 101 and one or more associated UAS/flight platforms 110 in accordance with an embodiment of the disclosure. In display view 800, a user is selecting a particular flight platform 110 already assigned a particular search pattern 812 (e.g., using selector 801, which may correspond to a user finger on a touch screen display, for example, or a mouse pointer or other type of graphic display selector), and user interface 132 is rendering a search operations menu 810 over a chart 820 to allow for selection of a particular search operation for the selected flight platform 110 and/or search pattern 812, as shown. Chart 810 may correspond to a satellite image and/or other navigational chart data of an area around mobile structure 101, for example, such that mobile structure 101 and relative positions of one or more search patterns 812 and corresponding flight platforms 110 may be rendered within display view 800. In display view 900, user interface 132/controller 138 is monitoring positions of flight platforms 110 and rendering display view 900 to show those positions and corresponding search patterns 812, as described herein.

In addition, search patterns created using such display views, and traversal statistics and/or video data related to such search patterns, may be transmitted to other mobile structures 101 and/or to a base located on land (e.g., for coordination of larger search operations). As such, search patterns may be received from other mobile structures 101 and/or a terrestrial base, along with associated traversal statistics, and such search patterns and traversal statistics and corresponding sensor data/video may be displayed to a user of mobile structure 101 to help coordinate search efforts. While operating under such coordination, flight platforms originally assigned to one mobile structure may be directed to land (e.g., and refuel/recharge) on a different mobile structure so as to maximize time in the air without risk of floundering. Accordingly, in some embodiments, system 100 may be configured to control its own flight platforms and other vessels' flight platforms to coordinate return commands and traffic control for its own and other search operations.

In a further example of facilitating interoperability of UAS 110 with mobile structure 101 and/or a user of mobile structure 101, in some embodiments, embodiments of imaging system 100 may be configured to facilitate maneuvering operations of one or more flight platforms 110. For example, in some embodiments, user interface 132 and/or controller 138 may be configured to render a display view including a chart with overlays indicating a position, task, heading, and/or other maneuvering characteristics of flight platform 110, and in particular, relative to a position and/or other operational state of mobile structure 101. In various embodiments, user interface 132 and/or controller 138 may be configured to render a display view of a navigational chart where: the chart is centered on a particular flight platform 110 (e.g., not mobile structure 101), and the chart orientation is selected to follow a chart orientation render mode associated with mobile structure 101 (e.g., north-up—an absolute chart orientation; heading-up—a relative chart orientation tied to the current orientation of mobile structure 101; course-up—a relative chart orientation tied to the current position of mobile structure 101 and a corresponding route leg indicating a selected course for mobile structure 101); the chart is automatically ranged/scaled to keep mobile structure 101 and flight platform 110 visible within a single continuous chart/display view; the chart includes a line of sight indicator linking the positions of mobile structure 101 and a selected flight platform 110, so that a user viewing the display view can intuitively identify where flight platform 110 is relative to mobile structure 101, or where mobile structure 101 is relative to flight platform 110 (e.g., when viewing imagery provided by flight platform 110); the chart includes a flight platform heading vector (e.g., a COG vector, configured to indicate direction and speed of flight platform 110 and/or a field of view of a camera mounted to flight platform 110) for each flight platform 110 in the display view; the chart includes a camera view vector or cone configured to indicate a direction and/or field of view of a camera mounted to flight platform 110 and, optionally, a speed of flight platform 110, for each flight platform 110 in the display view; the display view may be configured to render a split view include the chart and camera feeds from platform 110; and the chart includes a range ring centered on mobile structure 101 or flight platform 110 to indicate a relationship between the current position of mobile structure 101 and/or flight platform 110 and a flight range of flight platform 110 (e.g. max or remaining flying time, typically dictated by remaining battery capacity and/or various environmental conditions).

For example, user interface 132, controller 138, and/or controller 112 may be configured to monitor a position and a remaining battery capacity of flight platform 110 and a position and speed of mobile structure 101. System 100 may be configured to generate a return command for flight platform 110 based on such measurements so that flight platform 110 can return to mobile structure 110 without risk of exhausting its propulsion system (e.g., fuel or battery capacity) before being able to intercept/return to and land on mobile structure 101. System 100 may be configured to determine an interception point between flight platform 110 and mobile structure 101 based on the projected course or route of mobile structure 101 (e.g., it's anticipated position(s)), for example, and to direct flight platform 110 to fly to the determined interception point.

Figure 10:
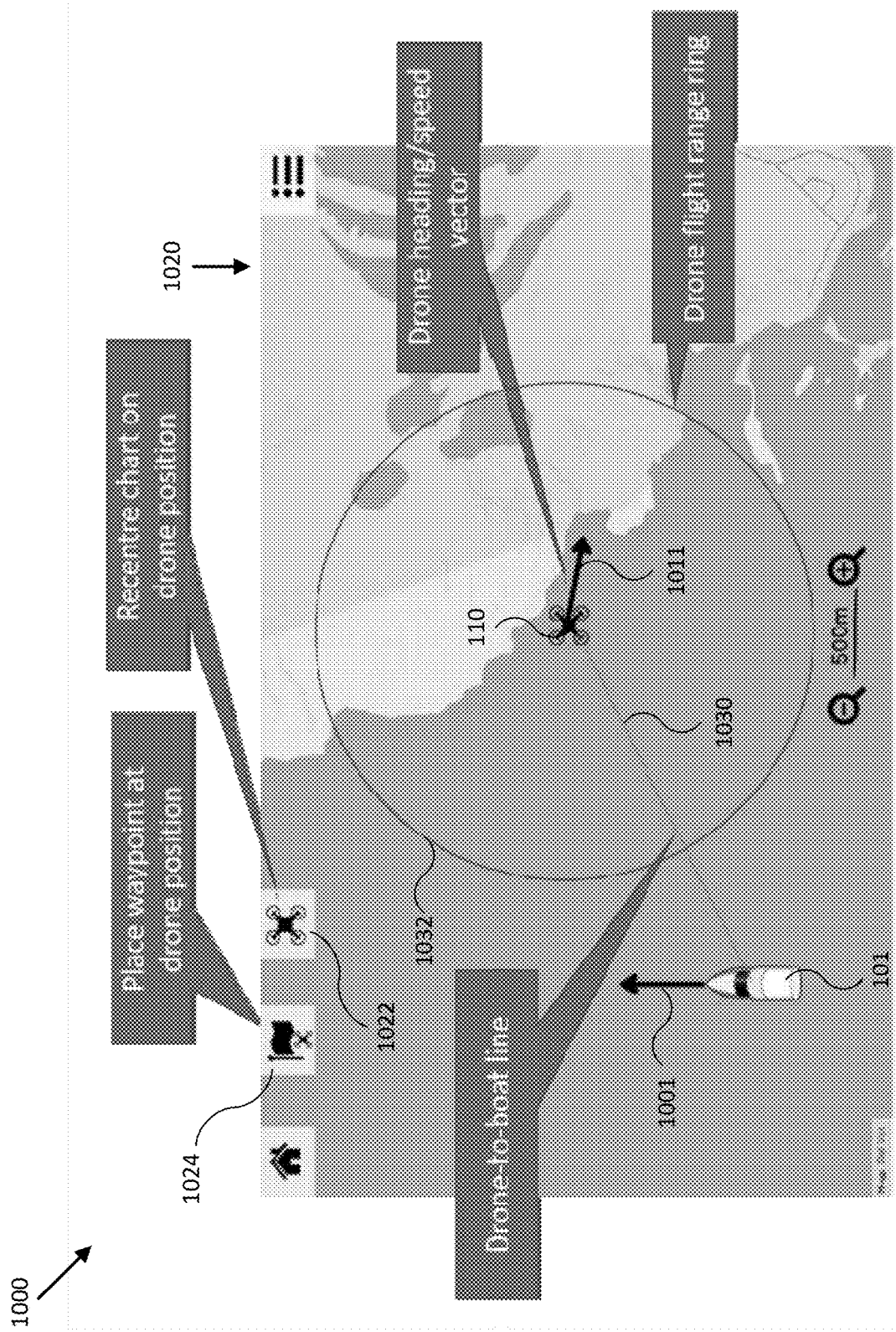
FIG. 10 illustrates a display view to facilitate maneuvering operations of an unmanned aerial system associated with a mobile structure in accordance with an embodiment of the disclosure.
Figure 11:
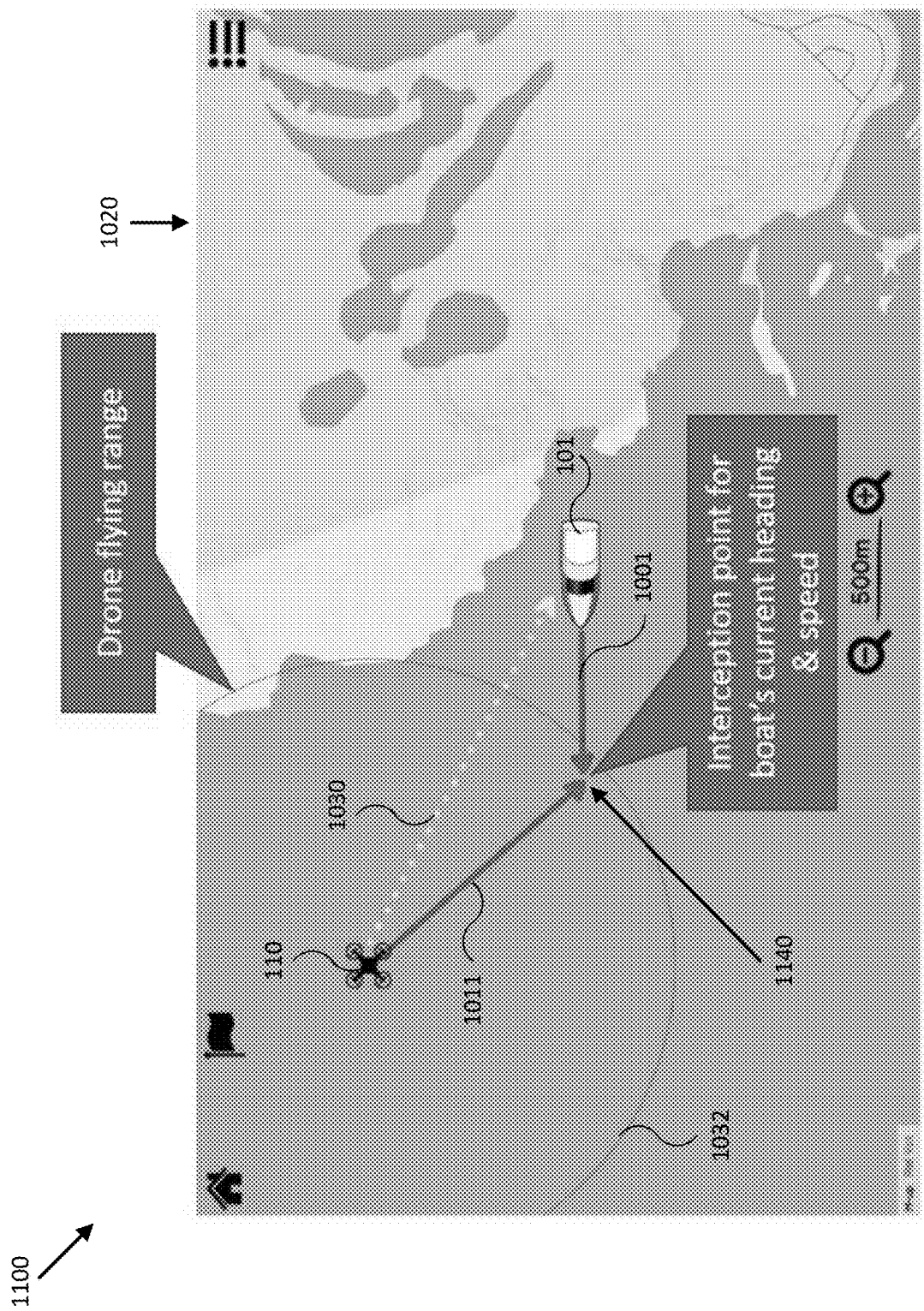
FIG. 11 illustrates a display view to facilitate maneuvering operations of an unmanned aerial system associated with a mobile structure in accordance with an embodiment of the disclosure.

FIGS. 10-11 illustrate display views 1000 and 1100 to facilitate maneuvering operations of UAS/flight platform 110 associated with mobile structure 101 in accordance with an embodiment of the disclosure. In display views 1000 and 1100, user interface 132/controller 138 is rendering various maneuvering overlay elements over navigational chart 1020 to indicate relative positions and/or other maneuvering characteristics, as described herein. For example, as shown in FIG. 10, display view 1000 shows mobile structure 101 and a corresponding mobile structure heading vector 1001, flight platform 110 and a corresponding flight platform heading vector 1011, line of sight indicator 1030 linking positions of mobile structure 101 and flight platform 110, and range ring 1032 indicating an estimated remaining travel range of flight platform 110. In the embodiment shown in FIG. 10, display view 1000 is centered on flight platform 110 and oriented according to a mobile structure heading-up chart orientation render mode, as described herein. In various embodiments, display view 1000 may include a number of selector buttons to adjust display view 1000, such as flight platform waypoint selector button 1024 (e.g., to mark a waypoint for flight platform 110) and/or flight platform center selector button 1022 (e.g., to cycle through available flight platforms and center display view 1000 on a position of a selected flight platform 110). As shown in FIG. 11, display view 1100 shows many of the same features identified in display view 1000, but additional includes intersection point 1140 to which flight platform is flying in order to intercept and land on mobile structure 101 (e.g., after receiving or generating a return command). As shown in FIG. 11, interception point 1140 lies within range ring 1032, which indicates that flight platform can safely traverse to intersection point 1140 and land on mobile structure 101 at its anticipated position without risking floundering.

In another example of facilitating interoperability of UAS 110 with mobile structure 101 and/or a user of mobile structure 101, in some embodiments, embodiments of imaging system 100 may be configured to record a fishing event (e.g., initial hook up, reeling in, and/or landing) using a camera mounted to flight platform 110, with minimal user input. For example, in some embodiments, user interface 132 and/or controller 138 may be configured to task flight platform 110 to take flight and orient itself at a preselected or programmatically identified (e.g., using motion detection statistics) position relative to mobile structure 101 and record video of a fishing event such that the activity around, on, and behind a designated fishing deck is in view. In this way, a fisherman who has suddenly experienced a "strike" (e.g., a fish bite detected on a fishing line) can trigger flight platform 110 to record the fishing event with minimal or single button user input. In various embodiments, such task may include a pre-defined observation maneuver (e.g., takeoff, fly to fixed height and fixed distance behind mobile structure 101), while using best efforts to orient a camera coupled to flight platform 110 at a pre-defined position relative to mobile structure 101 (e.g., at the stern of mobile structure 101) and, in some embodiments, according to a pre-defined relative observation angle (e.g., pitch and/or yaw angle relative to a heading of mobile structure 101) and/or range to the fishing event. Such observation maneuver should typically compensate for motion of mobile structure 101 during the fishing event. In a particular embodiment, a user may initiate such task by selecting a single button displayed in a display view rendered by user interface 132, for example. In some embodiments, system 100 may be configured to monitor a designated fishing deck for motion (e.g., using a camera mounted to mobile structure 101) or for sound (e.g., using a microphone) indicative of an impending fishing event. Upon detection of such motion or sound, system 100 may be configured to initiate a fishing event recording task automatically without additional user input.

Figure 12:
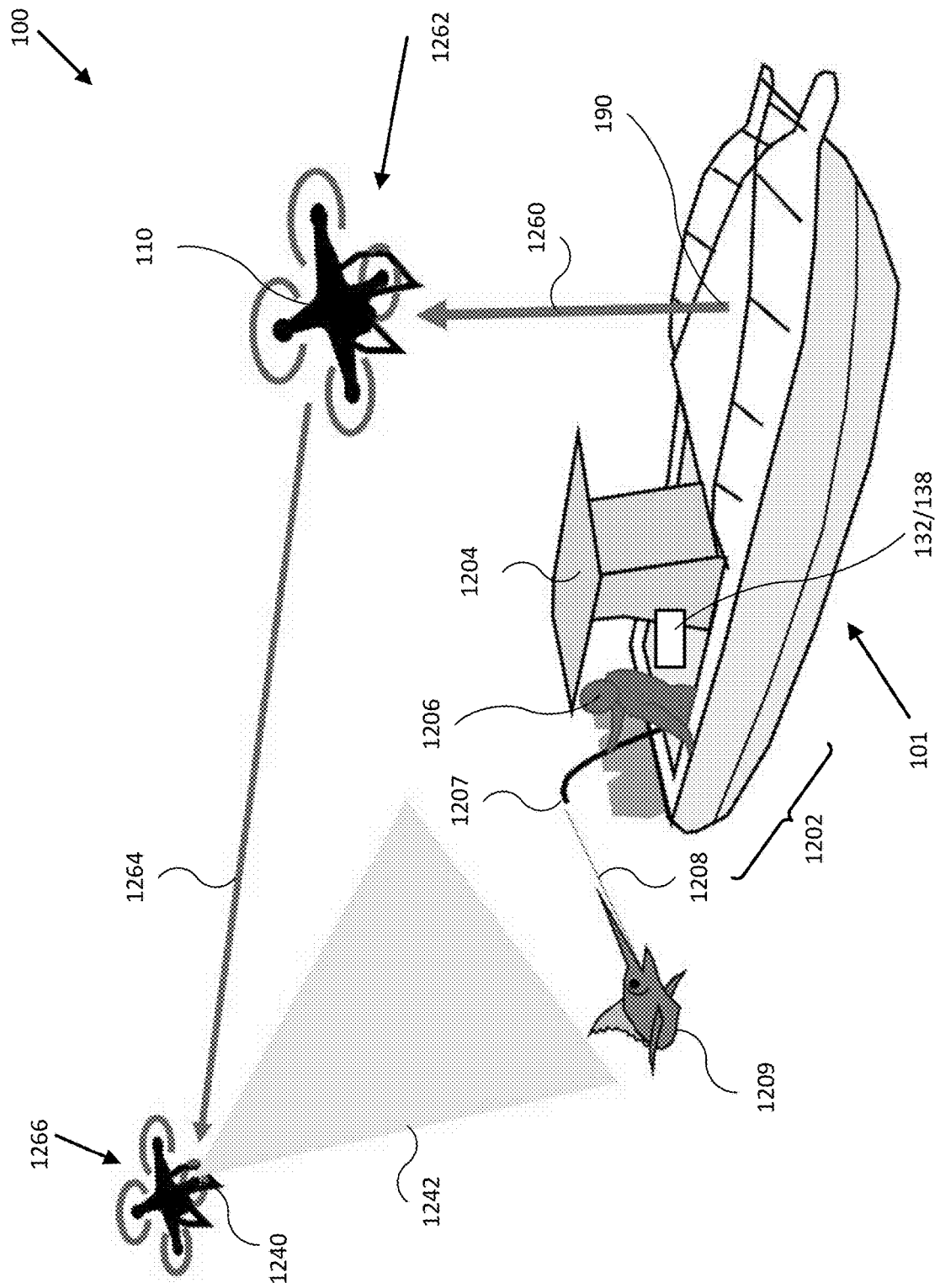
FIG. 12 illustrates a mobile structure with an associated unmanned aerial system in accordance with an embodiment of the disclosure.

For example, FIG. 12 illustrates mobile structure 101 with an associated UAS/flight platform 110 in accordance with an embodiment of the disclosure. As shown in FIG. 12, user interface 132/controller 138 of system 100 may be configured to monitor fishing deck area 1202 and/or helm area 1204 for motion or sound indicative of a fishing event, for example, or may be configured to receive user input from user 1206 indicating a fishing event is occurring, such as fish 1209 striking a lure or bait tied to fishing line 1208 and causing fishing rod 1207 to bend towards first 1209. Upon detecting such motion, sound, or other user input, user interface 132/controller 138 may initiate a fishing event recording task be transmitting an observation maneuver to flight platform 110. As shown in FIG. 12, such observation maneuver may include take off from flight platform receiver 190 along path 1260 to waypoint 1262, reorientation of flight platform 110 to view fishing deck area 1202, flight traversal along path 1264 (e.g., while adjusting an orientation of flight platform 110 and/or coupled camera 1240 to keep fishing deck area 1202 in view of camera 1240) to waypoint 1266, and then, if necessary, repositioning and/or reorientation of flight platform 110 and/or coupled camera 1240 to establish predetermined field of view 1242 of fishing deck area 1202, fish 1209, fishing rod 1207, and/or fisher 1206, as shown. Similar techniques can be used to monitor and/or record a bow area associated with mobile structure 101 that would typically include sport events, such as wake or tow sports (e.g., wake boarding, waterskiing, towed innertubing, and/or other wake or tow sports).

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

Embodiments described above illustrate but do not limit the invention. It should also be understood that numerous modifications and variations are possible in accordance with the principles of the present invention. Accordingly, the scope of the invention is defined only by the following claims.

We claim:
1. An apparatus comprising:
a logic device associated with a mobile structure and configured to operate when positioned with the mobile structure and, when positioned with the mobile structure, to:
communicate, to at least one of the one or more unmanned aerial systems (UASs), instructions to use an imaging device coupled to the one or more UASs to image at least a portion of the mobile structure;
receive unmanned aerial systems data (UAS data) from the one or more UASs associated with the mobile structure, wherein at least a portion of the UAS data comprises data associated with the imaged portion of the mobile structure, the imaging device comprising a thermal camera coupled to the one or more UASs;
determine one or more environmental conditions based, at least in part, on the UAS data;
generate an environmental condition determination based, at least in part, on the UAS data and/or the determined one or more environmental conditions; and
using the imaged portion of the mobile structure in the UAS data, identify one or more concern areas of the mobile structure.
2. The apparatus of claim 1, wherein the one or more concern areas comprise at least one of:
a damaged area of the mobile structure,
wildlife on the mobile structure, a flap angle of the mobile structure comprising a flap, and/or a sail configuration of the mobile structure comprising a sail.

3. An apparatus comprising:

a logic device associated with a mobile structure and configured to communicate with an imaging device, wherein the logic device is configured to operate when positioned with the mobile structure and, when positioned with the mobile structure, to:

receive unmanned aerial systems (UAS) data from one or more UASs associated with the mobile structure, wherein at least a portion of the UAS data comprises data associated with the imaging device, the imaging device comprising a thermal camera coupled to the one or more UASs;

determine one or more environmental conditions based, at least in part, on the UAS data;

generate an environmental condition determination based, at least in part, on at least one of: (1) the UAS data and (2) the determined one or more environmental conditions; and determine instructions associated with landing at least one of the UASs on the mobile structure; and provide the determined instructions to the at least one UAS;

wherein the UAS data is associated with one or more of:

at least one of the one or more environmental conditions, wherein the at least one environmental condition is associated with an environment local to the mobile structure;

a sway of the mobile structure;

a velocity of the mobile structure; and a position of a flight platform receiver on the mobile structure, wherein:

the determining the instructions associated with landing the at least one UAS on the mobile structure comprises determining an orientation of the flight platform receiver and matching an orientation of the at least one UAS to the orientation of the flight platform receiver; and the determined instructions are based, at least in part, on the UAS data and/or on the position of the flight platform receiver on the mobile structure;

wherein the logic device is configured to use one or more sensors coupled to the mobile structure to provide measurements of motion of the mobile structure to the at least one UAS in real time as the at least one UAS is landing on the mobile structure.

4. The apparatus of claim 2, wherein the one or more concern areas comprise the sale configuration allowing determination of a wind speed and/or direction.

5. The apparatus of claim 1, wherein the logic device is further configured to:

determine a presence and/or location of an object within an environment local to the mobile structure based, at least in part, on the UAS data; and communicate instructions to the one or more UASs to monitor a portion of the environment local to the mobile structure for the presence and/or location of the object, wherein the portion of the environment is determined based, at least in part, on the environmental condition determination, and wherein the generated environmental condition determination is associated with water current conditions and/or water temperature conditions.

6. The apparatus of claim 1, wherein the logic device is further configured to determine and communicate positioning instructions to the one or more UASs, and wherein the positioning instructions are determined based, at least in part, on a velocity of the mobile structure.

7. The apparatus of claim 3, wherein the motion comprises moving laterally or longitudinally, heaving vertically, rolling, and pitching.

8. The apparatus of claim 1, wherein the logic device is further configured to:

determine a distance between the mobile structure and at least one of the one or more UASs;

determine a traversal range of the at least one UAS is less than the distance between the mobile structure and the at least one UAS;

identify a second mobile structure within the traversal range of the at least one UAS; and direct the at least one UAS to travel to and/or land upon the second mobile structure.

9. The apparatus of claim 1, further comprising a user interface comprising a display, wherein the logic device is further configured to:

display information on the one or more concern areas on the user interface.

10. The apparatus of claim 9, wherein the information on the one or more concern areas comprises a text message or a highlight.

11. The apparatus of claim 1, wherein the mobile structure is a watercraft, and the logic device is further configured to:

receive one or more search patterns from a user interface of the apparatus and/or from a shore base;

generate and/or transmit maneuvering and/or monitoring instructions for the one or more UASs based on the received one or more search patterns; and monitor the UAS data received from the one or more UASs as they traverse the one or more search patterns.

12. The apparatus of claim 1, wherein the one or more UASs comprises first and second UASs, and wherein the logic device is further configured to:

receive a range warning from the first UAS indicating that it lacks traversal capacity to complete an assigned search pattern;

transmit a return control signal to the first UAS to return to the mobile structure; and generate and/or transmit maneuvering and/or monitoring instructions for the second UAS to complete the assigned search pattern.

13. A method comprising:

communicating by the mobile structure, to at least one of one or more UASs, instructions to image at least a portion of the mobile structure;

receiving unmanned aerial systems (UAS) data from the one or more UASs associated with a mobile structure, wherein at least a portion of the UAS data comprises data associated with a thermal camera coupled to the one or more UASs, wherein the data associated with the thermal camera comprises data associated with the imaged portion of the mobile structure;

determining one or more environmental conditions based, at least in part, on the UAS data;

generating an environmental condition determination based, at least in part, on the UAS data and/or the determined one or more environmental conditions; and using the imaged portion of the mobile structure in the UAS data to identify, by a logic device, one or more concern areas of the mobile structure.

14. The method of claim 13, further comprising:
determining instructions associated with landing at least one of the one or more UASs on the mobile structure; and
providing by the mobile structure the determined instructions to the at least one UAS, wherein the UAS data is associated with one or more of:
a sway of the mobile structure;
a velocity of the mobile structure; and
a position of a flight platform receiver on the mobile structure.

15. The method of claim 13, further comprising:
determining a mobile structure route based, at least in part, on the one or more environmental conditions, wherein the mobile route comprises a plurality of race waypoints;
communicating instructions for monitoring at least a portion of the mobile structure route to the one or more UASs; and
determining a quickest route based, at least in part, on the UAS data and the plurality of race waypoints.

16. The method of claim 13, further comprising:
determining a distance between the mobile structure and at least one of the one or more UASs;
determining a traversal range of the at least one UAS is less than the distance between the mobile structure and the at least one UAS;
identifying a second mobile structure within the traversal range of the at least one UAS; and
directing the at least one UAS to travel to and/or land upon the second mobile structure.

17. The method of claim 13, further comprising the logic device causing a user interface to provide information on the one or more concern areas;
wherein the mobile structure is a watercraft.

18. The method of claim 13, wherein the one or more concern areas comprise at least one of:
a damaged area of the mobile structure,
wildlife on the mobile structure,
a flap angle of the mobile structure comprising a flap, and/or
a sail configuration of the mobile structure comprising a sail.

19. The method of claim 18, wherein the one or more concern areas comprise the sale configuration allowing determination of a wind speed and/or direction.

20. The method of claim 13, further comprising the mobile structure using one or more sensors coupled to the mobile structure to provide measurements of motion of the mobile structure to the at least one UAS in real time as the at least one UAS is landing on the mobile structure.

* * * * *